United States Patent
Lambert et al.

(10) Patent No.: US 8,116,233 B2
(45) Date of Patent: Feb. 14, 2012

(54) IP ASSIGNMENT SCHEME FOR DYNAMIC PEER-TO-PEER NETWORKS

(75) Inventors: Paul A. Lambert, Mountain View, CA (US); Raja Banerjea, Sunnyvale, CA (US); Milind Kopikare, San Jose, CA (US); Robert Fanfelle, Redwood City, CA (US)

(73) Assignee: Marvell World Trade Ltd., St. Michael (BB)

( * ) Notice: Subject to any disclaimer, the term of this patent is extended or adjusted under 35 U.S.C. 154(b) by 234 days.

(21) Appl. No.: 12/499,885

(22) Filed: Jul. 9, 2009

(65) Prior Publication Data

US 2010/0054154 A1    Mar. 4, 2010

Related U.S. Application Data

(60) Provisional application No. 61/080,148, filed on Jul. 11, 2008.

(51) Int. Cl.
*H04L 12/28* (2006.01)
(52) U.S. Cl. ...... 370/255; 370/254; 370/295.3
(58) Field of Classification Search ............ None
See application file for complete search history.

(56) References Cited

U.S. PATENT DOCUMENTS

| | | | | |
|---|---|---|---|---|
| 5,185,860 A | * | 2/1993 | Wu | 709/224 |
| 6,101,499 A | * | 8/2000 | Ford et al. | 1/1 |
| 7,152,099 B1 | * | 12/2006 | Arens | 709/220 |
| 7,257,182 B1 | * | 8/2007 | Elliott et al. | 375/365 |
| 7,848,263 B2 | * | 12/2010 | Chhabra | 370/255 |
| 2003/0048806 A1 | | 3/2003 | Haartsen | |
| 2006/0126611 A1 | | 6/2006 | Kelly et al. | |
| 2008/0123558 A1 | | 5/2008 | Chhabra | |

OTHER PUBLICATIONS

Nov. 3, 2009 International Search Report issued in PCT/US2009/050007.
Nov. 3, 2009 Written Opinion in PCT/US2009/050007.

* cited by examiner

*Primary Examiner* — Robert Wilson

(57) ABSTRACT

An approach for assigning IP network addresses and for performing name resolution and service discovery in infrastructure mode and/or ad-hoc mode peer-to-peer networks. The size of an ad-hoc network and/or the size of infrastructure network basic service sets may be limited to a selected number of peer stations. A first portion of an IP network address assigned to stations joining a network may be predetermined by the network to be joined and a second portion of the IP network address may be selected dynamically, as each new station joins the network. Stations may generate layer 2 messages that include an information element containing information that supports peer-to-peer service discovery, name resolution and IP network address assignment across multiple ad-hoc and infrastructure networks. A peer-to-peer station may dynamically connect to available ad-hoc or infrastructure networks to access required services, as needed.

15 Claims, 16 Drawing Sheets

IP ASSIGNMENT SCHEME FOR DYNAMIC PEER-TO-PEER NETWORKS

INCORPORATION BY REFERENCE

This application claims the benefit of U.S. Provisional Application No. 61/080,148, "IP ASSIGNMENT SCHEME FOR DYNAMIC PEER TO PEER NETWORKS," filed by Raja Banerjea, Robert Fanfelle, Milind Kopikare and Paul Lambert on Jul. 11, 2008, and is related to U.S. patent application Ser. No. 11/944,980, "SIMPLIFIED AUTO-CONFIGURATION AND SERVICE DISCOVERY IN AD-HOC NETWORKS" filed by Kapil Chhabra on Nov. 26, 2007, both of which are incorporated herein by reference in their entirety.

BACKGROUND

Over the past few years, consumers have embraced digital technology. Consumer acceptance has been driven by the availability of services such as high-speed links to the Internet, wired and wireless home networks, and the growth of digital cafés offering a variety of opportunities for social interaction and services. Consumer acceptance has also been driven by the availability of a wide range of digital technology products such as laptop computers, hand-held computers, digital cell phones, video and audio recording and/or playback devices. The widespread acceptance and use of digital technologies has led to a high demand for seamless, transparent connectivity, communication and interoperability between the respective digital devices, and between the respective digital devices and available services that enhance the usefulness of the respective digital devices and/or facilitate their use.

The ability to dynamically organize wireless electronic devices into infrastructure mode and ad-hoc mode wireless networks holds promise for meeting user demands for seamless, transparent connectivity and interoperability between digital devices and between digital devices and available services. However, existing infrastructure mode and ad-hoc mode network implementations are overly complex and burdensome and fall short of meeting user needs. Existing infrastructure mode and ad-hoc mode networks, e.g., such as infrastructure mode and ad-hoc mode networks based on the IEEE 802.11 standard, require a level of complexity that increases device processing and memory requirements, increases device production costs, and decreases operational efficiency. Further, existing peer-to-peer and ad-hoc networks have characteristics that prevent the effective use of existing layer 3 IP address assignment and service discovery techniques. For example, some existing peer-to-peer and ad-hoc networks rely on IP address assignments made using the Dynamic Host Configuration Protocol (DHCP), but a DHCP server may not be available in dynamic networks. Other existing peer-to-peer and ad-hoc networks may implement a local addressing mechanism that requires the use of multicast network services, however, multicast transmissions will not always reach all the devices in dynamic peer-to-peer and ad hoc networks.

Thus, it would be desirable to provide approaches for implementing infrastructure mode and ad-hoc mode networks between wireless digital devices that provide seamless, transparent connectivity and interoperability between digital devices and available services, yet reduce device hardware requirements, reduce device complexity and production costs, and improve operational efficiency.

SUMMARY

An approach is described for performing service discovery and name resolution, and for autoconfiguring wireless stations for operation in infrastructure mode and/or ad-hoc mode peer-to-peer networks. The size of an ad-hoc network and/or the size of infrastructure network basic service sets may be limited to a selected number of peer stations. A first portion of an IP network address assigned to stations joining a network may be predetermined by the network to be joined and a second portion of the IP network address may be selected dynamically, as each new station joins the network. Stations may generate layer 2 messages that include an information element containing information that supports peer-to-peer service discovery, name resolution and IP network address assignment across multiple ad-hoc and infrastructure networks. A peer-to-peer station may dynamically connect to available ad-hoc or infrastructure networks to access required services, as needed.

In example embodiments of the described network approach, the size of an ad-hoc mode network and/or the size of an infrastructure mode basis service set may be reduced below a size that could otherwise be supported by a selected address format, e.g., a 4 byte IP address format, a 6 byte address format, etc. For example, assuming that no more than 256 stations are desired in an ad-hoc mode network, or in a single basic service set (BSS) of an infrastructure mode network, that is based on a four byte network address format, a first portion, e.g., the first three bytes, of network addresses assigned to stations joining a network may be determined by the network being joined. A second portion, e.g., the fourth or last byte, of the network addresses may be selected dynamically, as each new station joins the respective network. In other example embodiments of the described network approach, the maximum number of stations allowed to join a network may be increased to a number greater that 256, or reduced to a number less than 256. In such embodiments, the number of bits fixed in the address first portion, and the number of bits dynamically selected in the address second portion may be adjusted to support the maximum number of stations allowed to join a single ad-hoc mode network, or a single infrastructure mode basic service set, at any one time. However, there is no limit to the number of ad-hoc networks that may be formed simultaneously in the same geographic area, nor is there a limit on the number of basic service sets that may be joined to form a common infrastructure mode extended service set (ESS), and there is no limit to the number of infrastructure mode extended service sets that may be formed in the same geographic area.

Example embodiments of a station that supports the described network approach may generate an information element that may be included in layer 2 network messages, e.g., beacons, probe-requests, public action frames, and/or probe-responses, that are generated and transmitted to surrounding wireless devices. An example information element may include: (1) a network address, e.g., an IP network address, currently associated with the transmitting station; (2) a 4-byte timestamp field which indicates a number of milliseconds since the station claimed the network address; (3) a user-friendly name to identify the station; (4) a universally unique identifier (UUID) for each service offered by the transmitting station; and (5) a network-address-in-use bitmap, as addressed in greater detail below. Using such an approach, knowledge of the rest of the network, e.g., for IP address uniqueness and/or service discovery, may be retrieved from a single peer device. A single peer device can now indicate the availability of services for the network in a distributed manner. Such a capability allows the availability of services to be made available in dynamic peer-to-peer and ad hoc networks without the use of such features as a DHCP server and without the use of multicast transmissions.

A station, or local station, in the ad-hoc or peer-to-peer network may maintain a local data store that may contain for each peer station, regardless of whether the peer station is connected to an ad-hoc network or to an infrastructure mode network, a network address, e.g., an IP network address, a user-friendly name, and UUID for each service offered by the peer station. A station may learn about peer station IP network addresses, names and services from respective received messages, e.g., beacons, probe-requests, public action frames, and/or probe-responses. Data store entries within a station's local data store may use a peer station's MAC address as a primary key. An entry for a peer station within a station's local data store may expire and may be deleted from the station's local data store if a message, e.g., a beacon, probe-request, public action frame and/or probe-response is not received from the corresponding peer station within a configurable time duration and is not identified in network beacon signals indicating that the station is still available via an existing ad-hoc or infrastructure mode network.

Stations configured to support embodiments of the described network approach may synchronize their local clocks based on timestamp information included within received layer 2 messages. For example, each station may be configured to update its local clock based on timestamp information included in a received message whenever the received timestamp data is greater than its own clock value. In this manner, peer stations within the same ad-hoc network or infrastructure mode network may synchronize their respective local clocks, and may thereby synchronize their respective actions.

For example, a first station within a newly formed network may define a target beacon transmission time (TBTT) that reoccurs every TBTT interval, e.g., 100 ms. The TBTT and TBTT interval may be controlled by control parameters that are adopted by each new station as it joins the network. By synchronizing their respective clocks, as described above, each TBTT may occur simultaneously within each of the respective stations.

Further, stations within example embodiments of the described ad-hoc network may be configured with a pre-TBTT timer that expires prior to each TBTT. On expiration of a pre-TBTT timer, each station may parse its local data store and may generate a network-address-in-use bitmap that indicates whether network addresses within an available set of network addresses are allocated or unallocated by peer stations in the network. For instance, if network address 169.254.1.10 is used by a peer station, bit 10 of the network-address-in-use bitmap may be set to 1, otherwise, bit 10 of the network-address-in-use bitmap may be set to 0. Assuming the ad-hoc mode network or infrastructure mode basic service set is limited to 256 or less stations, the network-address-in-use bitmap may be 256 bits in length. However, if the maximum number of stations allowed to join a network were to be increased to a number greater that 256, or reduced to a number less than 256, the number of bits in the network-address-in-use bitmap may be adjusted accordingly.

The network-address-in-use bitmap for a network may be updated by a station to remove IP addresses that are no longer in use on the network upon failing to receive a message from the station associated with the IP address for a predetermined period of time, and/or upon receiving a network beacon message with a network-address-in-use bitmap indicating that the IP address is no longer allocated. The network-address-in-use bitmap may be included in outgoing layer 2 network messages. Regardless of the size of the network-address-in-use bitmap, the bitmap may be compressed to reduce the size of the bitmap prior to transmission in an ad-hoc message. The network-address-in-use bitmap may be reduced in size using any desired size reduction and/or compression technique. For example, stations may be configured to choose the lowest network address available to reduce the number of bits required to identify the set of allocated network addresses and unnecessary bits may be truncated.

A station interested in auto-configuring itself with a network address may use a peer station's network-address-in-use bitmap and may choose an address that is not in use. After choosing a network address, the station may attempt to send out a beacon or an unsolicited probe-response following the next TBTT, and/or following a predetermined number, e.g., 2, 3, 4, or any other predetermined integer N, of subsequent TBTT(s). The beacon/probe-response may contain the information element, described above, and may be used to announce a station's newly allocated network address, user-friendly name, and list of service the station may provide, so that peer stations may update their respective data stores.

Using such an approach, there remains a possibility that two stations may choose the same network address at the same time or that two stations may select the same network address based on received network-address bitmaps that contain obsolete information. Such a conflict may be detected when a station hears a network address in a message received from a peer station that matches its own local network address. In such a scenario, the station may use the 4-byte timestamp, included in the message received from the peer station, to unambiguously decide which station should retain the right to use the address. In one example embodiment, a station with an older timestamp may continue to use the same network address while a station with a more recent timestamp may parse one or more of the network-address-in-use bitmaps stored in its local data store to choose a different network address.

The described approach allows a peer station to discover services available from other peer stations within any of multiple ad-hoc mode networks or in any of multiple infrastructure mode networks. For example, a station may send a probe-request, or public action frame, containing an information element bearing a user-friendly name and/or list of services the querying station is interested in. In response to a received probe-request, or public action frame, a peer station, regardless of the network or type of network that the peer station is connected to, may parse its local data store and may respond if it locates information that would be responsive to the received probe-request message or public action frame. In one example embodiment, a querying station may issue a probe-request message, or public action frame, a predetermined number, e.g., 2, 3, 4, or any other predetermined integer N, before deciding that a desired name/service is unavailable on the network.

Once a desired service is located on a peer station, the station desiring access to the service may connect to the network to which the service providing peer station is connected, and may establish a direct or indirect communication channel via the network with the service providing peer station to access the located service.

BRIEF DESCRIPTION OF THE DRAWINGS

Example embodiments of peer-to-peer stations and peer-to-peer wireless networks that support simplified service discovery and name resolution, and the autoconfiguration of wireless stations for operation in infrastructure mode and/or ad-hoc mode peer-to-peer networks, will be described with reference to the following drawings, wherein like numerals designate like elements, and wherein.

DETAILED DESCRIPTION OF EMBODIMENTS

Figure 1:
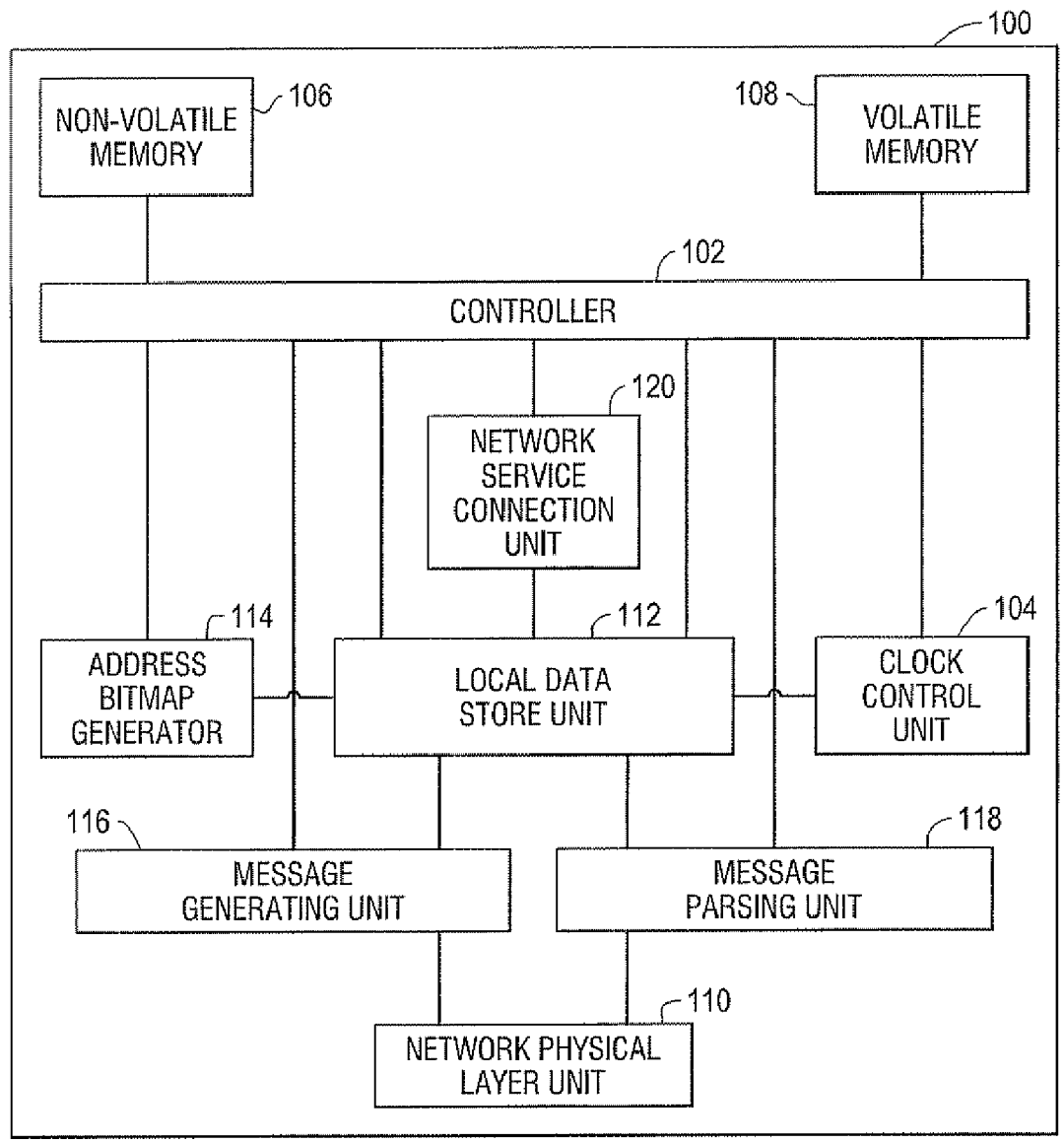
FIG. 1 is a block level diagram of an example wireless device, or station, that supports simplified auto-configuration, service discovery and name resolution, while operating in either an infrastructure wireless network mode or an ad-hoc wireless network mode.

FIG. 1 is a block level diagram of an example wireless device, or station, that supports simplified auto-configuration, service discovery, and name resolution while operating in either an infrastructure wireless network mode or an ad-hoc wireless network mode. As shown in FIG. 1, a station 100 may include a controller 102 in communication with a clock control unit 104, non-volatile memory 106, volatile memory 108 and a network physical layer unit 110. In addition, controller 102 may communicate with a local data store unit 112, an address bitmap generator 114, a message generating unit 116, a message parsing unit 118 and a network service connection unit 120.

The features included within station 100 may be integrated within one or more user electronic devices such as a desktop or laptop computer, cell phone, digital camera, scanner, printer, plotter, and the like. A device incorporating station 100 may connect to a local peer-to-peer network using either an infrastructure wireless network mode or an ad-hoc wireless network mode. In this manner, station 100 may provide seamless, transparent connectivity between the device in which station 100 is incorporated and services provided via either an available infrastructure mode wireless network or an available ad-hoc mode wireless network.

For example, in one embodiment, functions performed by network physical layer unit 110, e.g., layer 1, or physical layer, of the Open System Interconnection (OSI) model, may be performed, by a network interface card (NIC) added to an electronic device, or by a physical layer unit embedded with an electronic device's circuitry. Functions performed by controller 102, and subsequent layers of the OSI model, or other network communication model, may be performed by software executed, for example, by a general microprocessor in electronic devices such as a desktop or a laptop computer, or may be executed, for example, by a separate processor in electronic devices such as printers, digital cameras, and scanners.

Controller 102 may control processing related to the receipt and transmission of messages across network physical layer unit 110 in accordance with existing ad-hoc network standards, such as the ad-hoc network standard described in IEEE 802.11, but modified as described in greater detail below, to support simplified auto-configuration, service discovery and name resolution. Volatile memory 108 may allow the controller 102 to store program instructions in local memory for execution and to store and maintain temporary variables necessary for execution of the stored program instructions. Non-volatile memory 106 may allow the controller 102 to access and retrieve larger bodies of data and program instructions for later execution by the controller 102. Example processes executed as a result of the execution of such instructions are addressed below with respect to FIG. 4 through FIG. 16.

Clock control unit 104 may control a local oscillator, or clock, and may provide the controller 102 with a clock which may be used by the controller 102 to schedule actions for execution. For example, the controller 102 may set/update a time maintained by the clock control unit 104 based on messages received via an infrastructure mode, or ad-hoc mode network, that station 100 has joined. For example, if the station 100 is connected to an infrastructure mode network and receives a beacon message from the infrastructure mode network access point with a basic service set (BSS) timestamp greater that the time maintained by the station 100, the controller 102 may instruct the clock control unit 104 to update the time maintained by the clock control unit 104 based on the received BSS timestamp. Further, if the station 100 is connected to an ad-hoc mode network and receives a beacon message from another station connected to the ad-hoc network with an independent basic service set (IBSS) timestamp greater that the time maintained by the station 100, the controller 102 may instruct the clock control unit 104 to update the time maintained by the clock control unit 104 based on the received IBSS timestamp. In addition, the controller 102 may provide the clock control unit 104 with a target beacon transmission time (TBTT), a TBTT interval, and a pre-TBTT interval retrieved, for example, from the non-volatile memory 106. Thereafter, the clock control unit 104 may provide notifications to the controller 102 when each pre-TBTT and TBTT event occurs based on the synchronized clock time.

Local data store unit 112 may build and maintain a local data store with information about detected peer stations from which messages, e.g., beacons, probe-requests, public action frames, and/or probe-responses, have been received by the station 100, either as a result of the station 100 being a member of a common ad-hoc or infrastructure network, or as a result of the station 100 passively scanning and monitoring local message activities. The peer stations may be stand-alone devices, members of the same ad-hoc or infrastructure network to which the station 100 is connected, or members of an ad-hoc or infrastructure network to which the station 100 is not currently connected.

For example, information maintained in the local data store unit 112 may include for each peer station within transmission range of the station 100, or connected to an infrastructure mode network with a portion of the infrastructure mode network within transmission range of the station 100, a network address, a user-friendly name, and UUID for each service offered by the peer station. Data store entries may use a peer station's MAC address as a primary key in the local data store.

The local data store may also be configured to include information about the peer station, e.g., the peer station's selected network address, user-friendly name, and UUID for each service offered by the peer station. Table 1 provides a summary of information items that may be included within a record for a peer station within a local data store of the station 100. Information stored in the local data store by the local data store unit 112 may be received from the controller 102, and/or directly from other units such as the message parsing unit 118, the network service connection unit 120, the message generating unit 116, the clock control unit 104, and the address bitmap generator 114.

TABLE 1

Example Station Local Data Store Record Description

| | CONTENT ITEM | DESCRIPTION |
|---|---|---|
| 1 | MAC Address | MAC address of peer station to which information described in the fields below pertains |
| 2 | BSSID | If the peer station is connected to an infrastructure network, the basic service set (BSS) identifier (BSSID) of the infrastructure network, e.g., the MAC address of the BSS access point device |
| 3 | SSID | If the peer station is connected to an infrastructure network, the extended service set (ESS) identifier (SSID) of the infrastructure network to which the BSS is connected, e.g., an octet string, 1-32 octets |
| 4 | Signal Strength | Signal strength, e.g., RSSI, associated with the last message received from the identified peer station |
| 5 | BSS/IBSS Timestamp | BSS/IBSS clock synchronization timestamp included in last message received from the identified peer station |
| 6 | IP network address | IP network address of the station originating the message, if connected to a network |
| 7 | 4-byte timestamp | Number of milliseconds since the peer station selected its selected network address |
| 8 | User-friendly name | User-friendly name that may be used to identify the peer station |
| 9 | Offered Service UUIDs | A list of UUID's; an UUID for each service supported by the peer station |
| 10 | network-address-in-use bitmap | Bitmap identifying which of the available network addresses within a predetermined set of network addresses have been allocated |

Message parsing unit 118 may receive a message from the network physical layer unit 110 and may parse the received message content to retrieve data that may be passed to the controller 102 and/or the local data store unit 112. For example, the message parsing unit 118 may parse a received message to obtain the MAC address, BSS/IBSS timestamp and other information from the message header, and may parse and retrieve information contained within the message such as the information element containing information that supports simplified auto-configuration and service discovery, as addressed in greater detail below. Information retrieved from a received message may be passed to the controller 102 for further processing and decision making and/or portions of the retrieved information may be passed directly to the local data store unit 112 for generating updates to the local data store. Further, the controller 102 may instruct the local data store unit 112 to update information stored in the local data store based on peer station information received from the message parsing unit 118. An entry for a peer station within a station's local data store may expire and may be deleted from the station's local data store if a message, e.g., a beacon, probe-request, public action frame, and/or probe-response is not received from the corresponding peer station within a configurable time duration, e.g. 5 minutes, and/or, assuming that the station 100 is connected to an infrastructure network, a beacon signal is received indicating that the IP address corresponding to the peer station is no longer in use.

Table 2 below, is a summary of information items that may be included within an example information element included within a transmitted message generated by a station that supports simplified auto-configuration and service discovery in ad-hoc networks.

TABLE 2

Example Information Element Content Items

| | CONTENT ITEM | DESCRIPTION |
|---|---|---|
| 1 | IP network address | IP network address of the station originating the message, if connected to a network |
| 2 | 4-byte timestamp | Number of milliseconds since the peer station selected its selected network address |
| 3 | User-friendly name | User-friendly name that may be used to identify the peer station |
| 4 | Offered Service UUIDs | A list of UUID's; e.g., one UUID for each service supported by the peer station |
| 5 | network address-in-use bitmap | Bitmap identifying which of the available network addresses within a predetermined set of network addresses have been allocated |

Message generating unit 116 may, at the instruction of the controller 102, generate an ad-hoc message for transmission to stations within radio broadcast range. The generated message may be one of a beacon message, probe-request, public action frame, probe-response, or other message, as described in greater detail below. For example, upon being instructed by the controller 102 of the type of message to be generated, the message generating unit 116 may retrieve current station information and generate an information element containing, but not limited to, the content items as shown in Table 2. Further, based on the type of message to be generated, e.g., beacon message, probe-request, public action frame, probe-response, etc., the message generating unit 116 may receive additional information from the controller 102 and/or may request additional information from the local data store unit 112 and/or the address bitmap generator 114, as addressed in greater detail below. Once the message is generated, the message generating unit 116 may send the message to the network physical layer unit 110 for transmission.

Network service connection unit 120 may assist the controller 102 with locating a peer station that may be accessed by the station 100 via an ad-hoc mode or infrastructure mode network to obtain a desired service. For example, as described in greater detail below with respect to FIG. 11 and FIG. 12, the network service connection unit 120 may search local data store unit 112 for a desired service listed in association with a peer station. Upon locating a desired service, the network service connection unit 120 may provide the controller 102 with the network information required, e.g., MAC Address, BSSID, SSID, etc., for the controller 102 to establish either an ad-hoc mode or infrastructure mode connection to the located peer station, thereby allowing the station 100 to seamlessly access services available via a peer station connected to any of one or more infrastructure mode networks and any of one or more ad-hoc networks.

Address bitmap generator 114 may, based on a request from either the controller 102 or the message generating unit 116, contact the local data store unit 112 to retrieve network-address information received from each peer station represented in the local data store. Address bitmap generator 114 may generate a network-address-in-use bitmap that may be used to record which network addresses, within a predetermined set of allowed network addresses in the ad-hoc network, have been allocated to stations within the ad-hoc network. For example, if network address 169.254.1.4, network address 169.254.1.87 and network address 169.254.1.235 are used by three stations forming an ad-hoc network, bits 4, 87 and 235 of the network-address-in-use bitmap may be set to 1, thereby indicating that these network addresses are currently taken. As addressed above, the network-address-in-use bitmap may be included in the information element included in outgoing messages. As described in greater detail below, messages containing the network-address-in-use bitmap may be monitored by stations interested in auto-configuring themselves to join the network. For example, based on the network-addresses indicated as allocated in the network-address-in-use bitmap, a station may, as part of the auto-configuration process, assign itself one of the network addresses that has not been allocated.

The network-address-in-use bitmap may be compressed to reduce the size of the transmitted bitmap. For example, stations may be configured to choose the lowest network address available to reduce the number of bits required to identify the set of network addresses in use. In such an approach, the bitmap could be reduced to the number of bits that have been allocated. In another approach, the network-address-in-use bitmap could be compressed by any algorithm that results in a reduced number of transmitted bits by, for example, the use of run-length coding, i.e., representing groups of zeros and/or groups of ones with a reduced number of bits.

As addressed in greater detail below, a station interested in auto-configuring itself with a network address may use the network-address-in-use bitmap generated by an access point or a peer station connected to the desired network to choose an address within that network that is not in use. Further, a station may parse a plurality of network-address-in-use bitmaps stored in the station's local data store, in association with the same ad-hoc mode network or infrastructure mode network of interest, and may select a network address that is indicated as unallocated in each of the stored network-address-in-use bitmaps. After choosing a network address, the station may attempt to broadcast its new network address to peer stations within transmission range by sending out a beacon, e.g., in ad-hoc mode, or an unsolicited probe-response, e.g., in infrastructure mode, following the next TBTT, and/or following a predetermined number, e.g., 2, 3, 4, or any other predetermined integer N, of subsequent TBTT(s). For example, to increase the likelihood that the station will be successful in transmitting a beacon or an unsolicited probe-response after choosing a network address, the station may reduce its beacon contention window for the next N TBTT(s). The beacon/probe-response may contain the information element described above, and may be used to announce the station's newly allocated network address, user-friendly name, and the services the station supports, so that peer stations may update their respective data stores.

Figure 2:
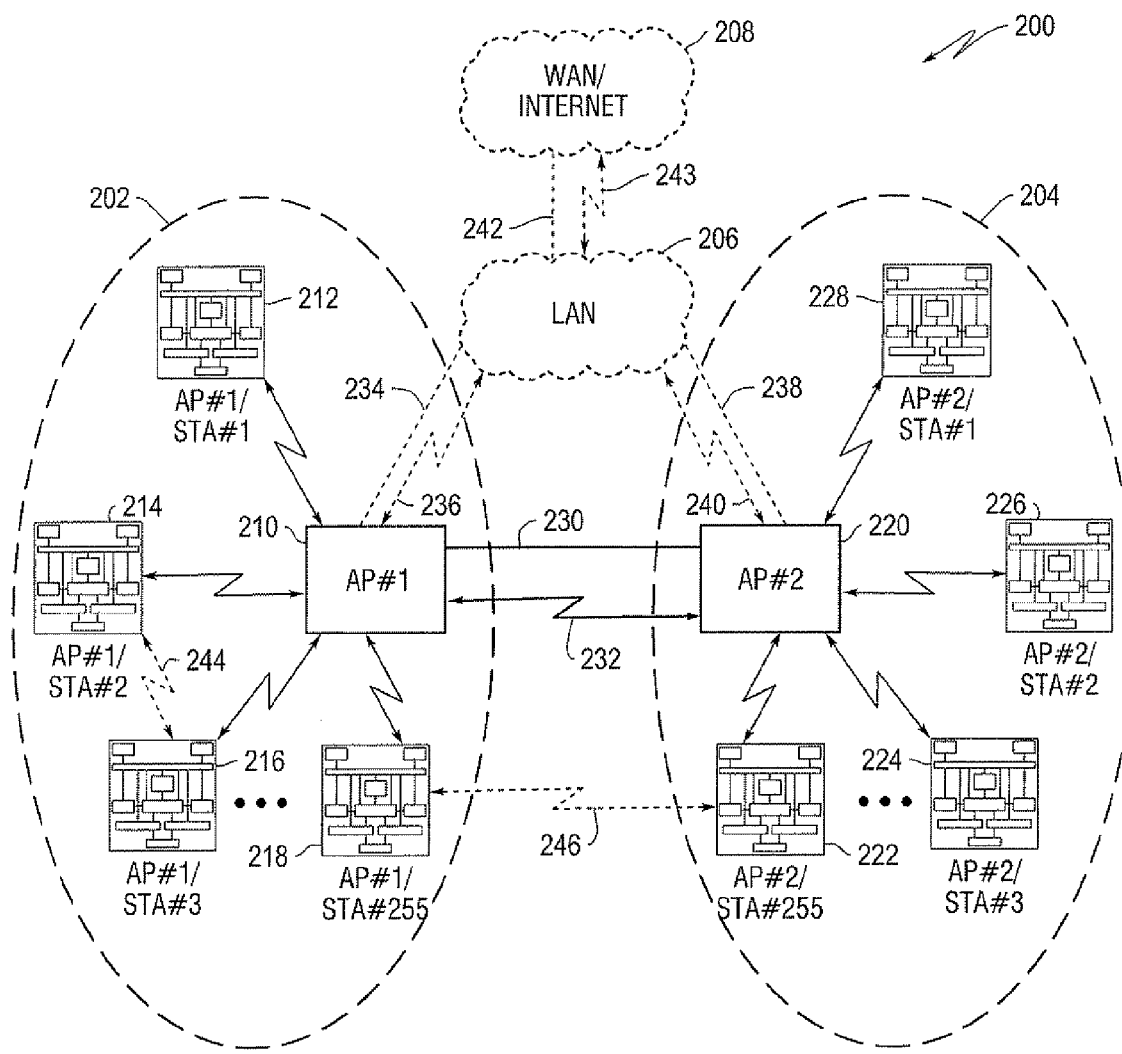
FIG. 2 is a schematic diagram of an example peer-to-peer infrastructure mode based network in which the stations of FIG. 1 operate in an infrastructure wireless network mode to connect to the peer-to-peer infrastructure network via a wireless access point.

FIG. 2 is a schematic diagram of an example infrastructure mode peer-to-peer network in which embodiments of the station 100, described above, may operate in infrastructure mode to connect to the peer-to-peer network via one of several wireless access points. As shown in FIG. 2, infrastructure mode peer-to-peer network 200 may include a first base service set 202, a second base service set 204, and a distribution service, represented in FIG. 2 as including a wire-based link 230 and/or a radio-based link 232 connecting the first base service set 202 with the second base service set 204. First base service set 202 may include a wireless access point 210 and as many as 255 stations operating in infrastructure mode to connect to the first base service set 202 via the wireless access point 210. For example, as shown in FIG. 2, the wireless access point 210 supports infrastructure mode network connectivity to station 212, station 214, station 216 and station 218. Second base service set 204 may include a wireless access point 220 and as many as 255 stations operating in infrastructure mode to connect to the second base service set 204 via the wireless access point 220. For example, as shown in FIG. 2, the wireless access point 220 supports infrastructure mode network connectivity to station 222, station 224, station 226 and station 228.

The infrastructure mode peer-to-peer network 200 is scalable in that as more and more stations require connectivity, additional access points may be added, each access point capable of connecting up to 255 additional stations each supporting the simplified auto-configuration and service discovery techniques, example features and characteristics of which are described below with respect to FIG. 4 through FIG. 16.

Base service sets within network 200 may be connected via their respective access points by additional distribution system links to form an extended service set (ESS). The described simplified layer 2 service discovery techniques allow a peer station within radio frequency reception range of any station connected to the extended service set (ESS) to discover available services offered by peer stations connected to the extended service set. Once a desired service is located, a peer station in need of the service may use the described simplified auto-configuration techniques to connect to the network to which the service-providing peer station is connected. Once a member of the same network to which the service-providing peer station is connected, the peer station in need of the service may establish a data channel with the service-providing peer station to access the service provided. Depending on the location of the service-providing peer station relative to the location of the peer station in need of the service, the established connection may be a direct RF connection, or an indirect connection via one or more access points.

For example, as shown in FIG. 2, after making a request through the access point 210, station 214 and station 216 may form a direct RF connection 244 to share information and service. However, a connection between station 212 and station 218 may require that the data be exchanged via the access point 210. Further, after making a request through the access point 210 and the access point 220, station 218 and station 222 may form a direct RE connection 246 to share information and services. However, a connection between station 218 and station 224 may require that the data be exchanged via the access point 210 and the access point 220.

As further shown in FIG. 2, the distribution system may be expanded to support links between the peer-to-peer extended service set and, for example, a wire-based local area network that may provide further connectivity to a WAN/Internet based network. For example, in FIG. 2, the distribution system may support a wire-based connection 234 and/or a wireless connection 236 between the access point 210 of BSS 202 and LAN 206, and the distribution system may support a wire-based connection 238 and/or a wireless connection 240 between the access point 220 of BSS 204 and LAN 206. Further, LAN 206 may connect to WAN/Internet base network 208 via a wire-based connection 242 and/or a wireless connection 243. Such an approach may be used to provide peer-to-peer stations connected to the extended service set with connectivity to LAN/WAN/Internet based networks via their respective peer-to-peer BSS/ESS based wireless connection.

It is noted that the infrastructure mode peer-to-peer network shown in FIG. 2 is scalable. For example, although the described infrastructure mode BSS may be limited to supporting up to a predetermined number, e.g., 255, of stations, there is no limit to the number of BSS's that are associated with an ESS. Therefore, an infrastructure node ESS in which the access points and wireless stations use the described simplified auto-configuration and service discovery techniques, may support connections from any number of stations operating in infrastructure mode.

Figure 3:
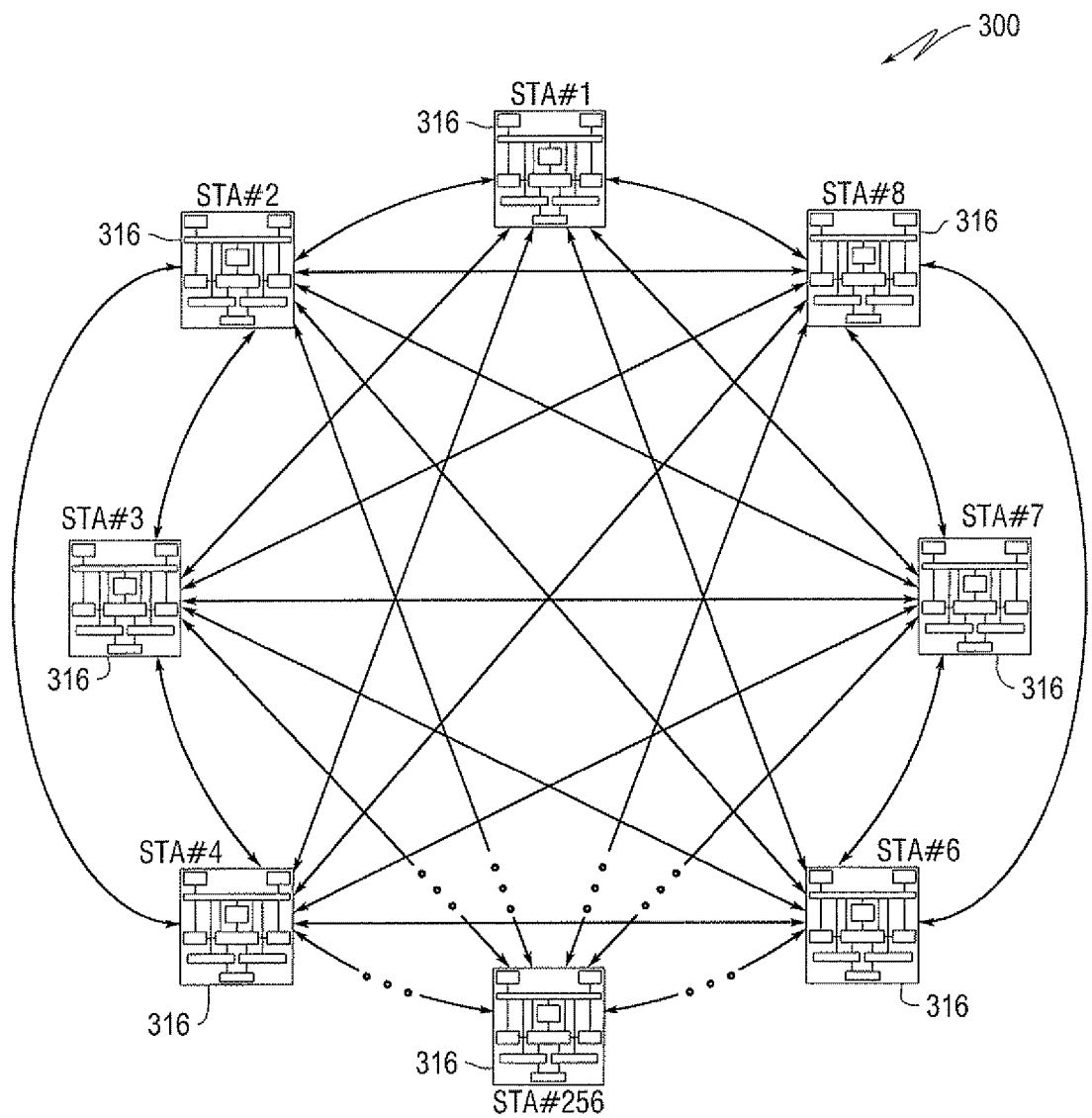
FIG. 3 is a schematic diagram of an example peer-to-peer ad-hoc mode based network in which the stations of FIG. 1 operate in an ad-hoc wireless network mode to form an ad-hoc wireless network.

FIG. 3 is a schematic diagram of an example ad-hoc mode peer-to-peer network in which embodiments of station 100, described above, may operate in ad-hoc mode to connect to the peer-to-peer network and may communicate directly with any of the peer stations connected to the ad-hoc network to exchange data and access services made available by the respective peer stations. As shown in FIG. 3, ad-hoc mode peer-to-peer network 300 may form an independent base service set (IBSS) that may include up to a predetermined number of stations, e.g., up to 256 concurrently connected stations. For example, as shown in FIG. 3, ad-hoc mode peer-to-peer network 300 may include a number of stations 316, all of which are operating in ad-hoc mode.

As shown in FIG. 3, the ad-hoc network 300 may be formed between as many as 256 stations, e.g., station STA#1, shown at 302, station STA#2, shown at 304 and as many as 254 additional stations, represented by dots in FIG. 3 leading to station STA#256 shown at 310. Each of stations STA#1 through STA#256 may support simplified auto-configuration and service discovery in ad-hoc networks and may include the example features and characteristics described above with respect to FIG. 1. Such an example ad-hoc network 300 may be used to provide seamless connectivity between such electronic devices as desktop/laptop computers, cell phones, digital cameras, scanners, and printers. By reducing the number of stations associated with an ad-hoc network, processing and memory requirements associated with providing such an ad-hoc network are reduced. As a result, the described approach may be incorporated within such devices to provide seamless connectivity between such electronic devices having reduced processing and memory capabilities.

It is noted that although the simplified auto-configuration and service discovery network approach may limit the number of stations that may join the ad-hoc network, the connectivity provided to stations within the ad-hoc network is not reduced. The described approach reduces hardware and processing requirements associated with providing such connectivity, thereby allowing more electronic devices to be cost effectively configured to support such connectivity. Further, multiple ad-hoc networks may be formed in the same geographic area.

As described in greater detail below with respect to FIG. 12 and FIG. 13, station 100 supports the described simplified auto-configuration and service discovery network approach across both ad-hoc mode and infrastructure mode networks. Therefore, station 100 may connect to one of several available infrastructure mode wireless networks or to one of several available ad-hoc mode wireless networks based on the services to which station 100 desires access. Further, station 100 may locate services offered by any peer station, regardless of whether the peer station is connected to an ad-hoc mode wireless network or an infrastructure mode wireless network. In addition, station 100 may seamlessly change the network to which station 100 is connected based on the service that station 100 desires and the network to which the peer station offering the desired service is connected. Once station 100 has made use of a desired service, station 100 may switch to any infrastructure mode network or ad-hoc mode network that station 100 determines best suits its needs.

It should be noted that infrastructure mode networks that support the described simplified auto-configuration and service discovery network approach and that share service data between basic service sets connected to the same extended service set, allow the station 100 to discover and to gain access to services that otherwise would not be accessible to the station 100. Further, allowing the station 100 to search both ad-hoc and infrastructure based networks without having to connect to the respectable network greatly reduces the processing overhead and time required to locate a desired service. In addition, allowing the station 100 to connect to a service providing peer station regardless of whether the peer station is connected to an ad-hoc based network or an infrastructure based network greatly facilitates access to located services.

Figure 4:
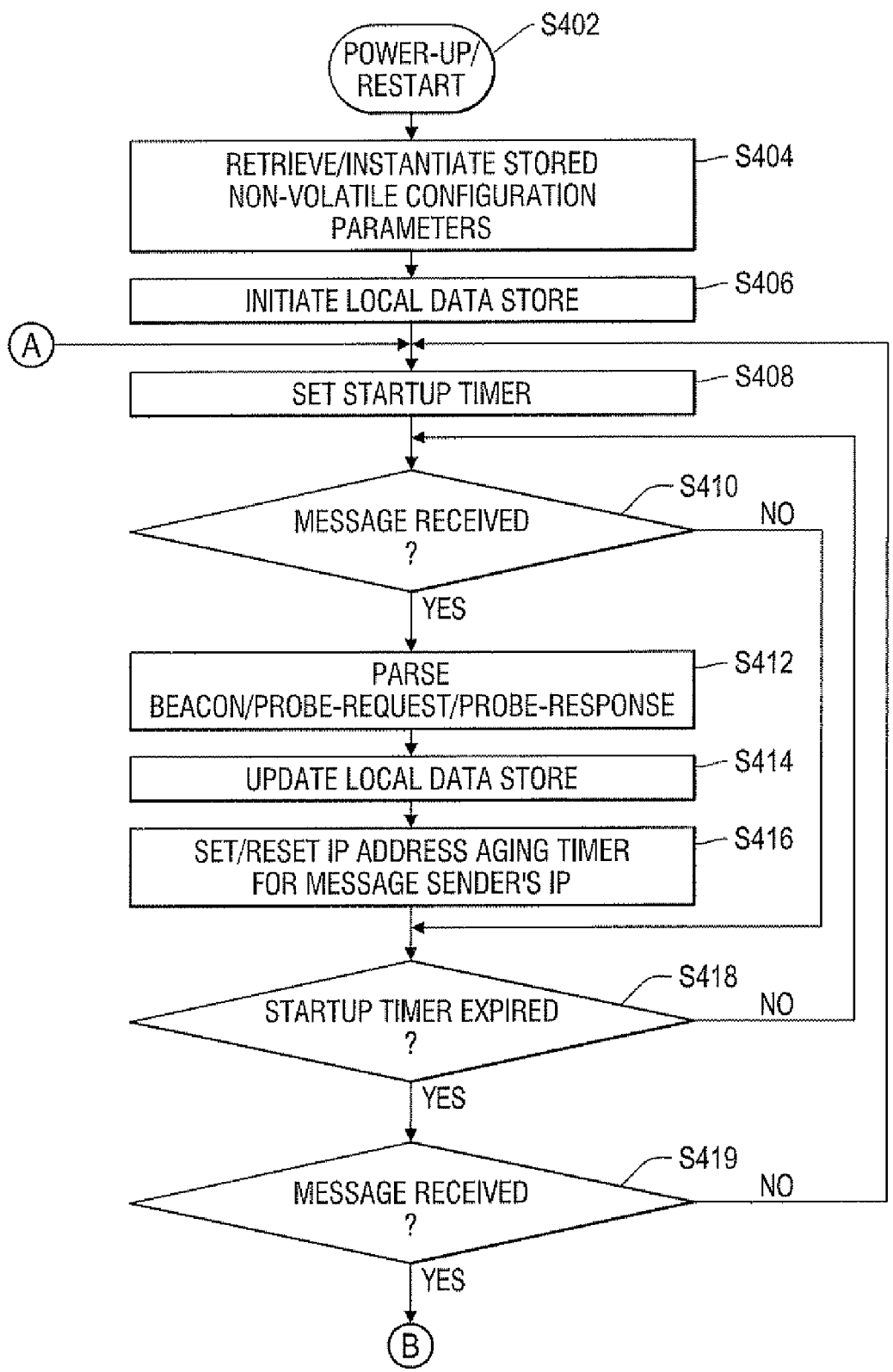
FIG. 4, FIG. 5, FIG. 6 and FIG. 7 are a flow diagram of an example startup and initial network connection process executed by an embodiment of the station of FIG. 1.
Figure 5:
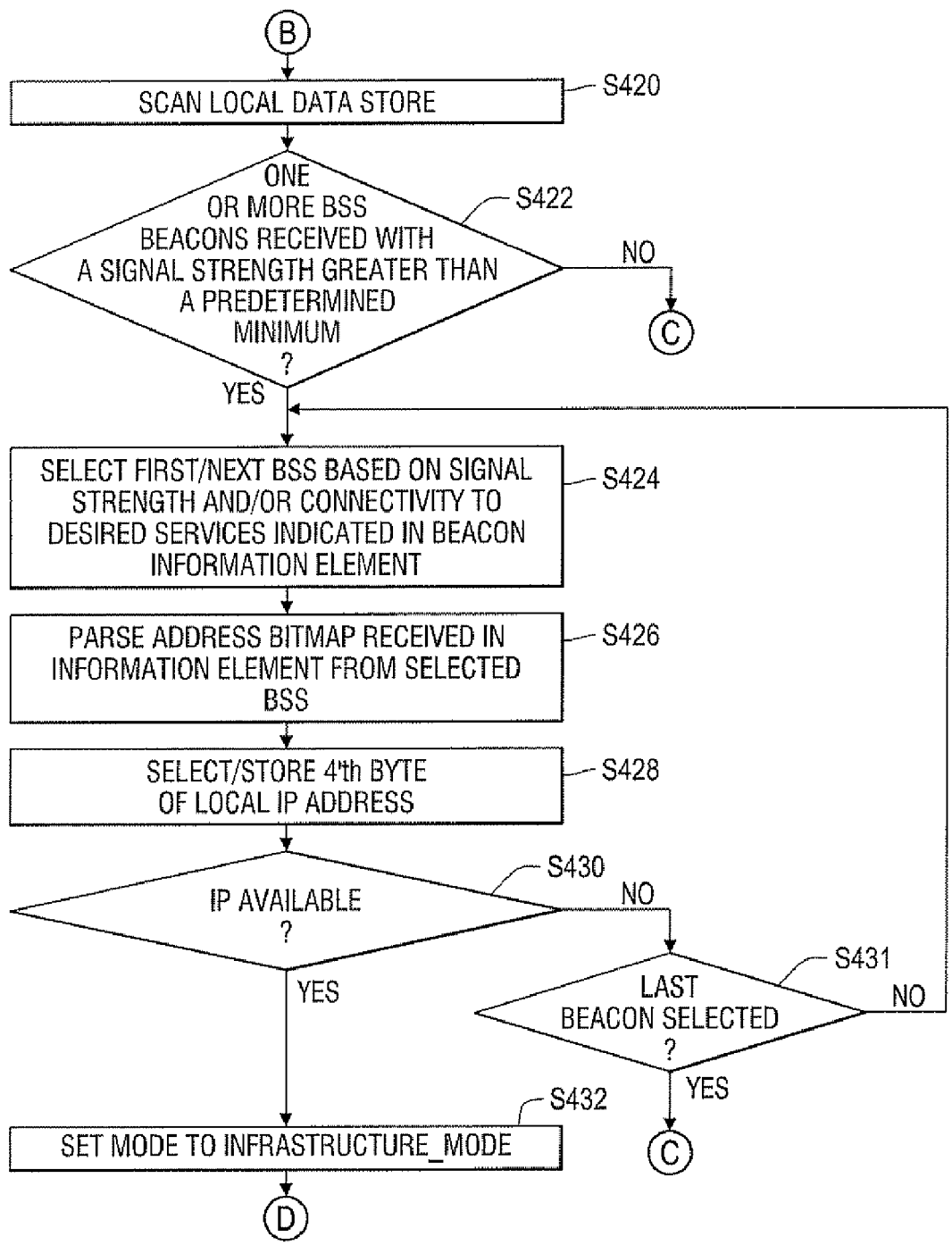
Figure 6:
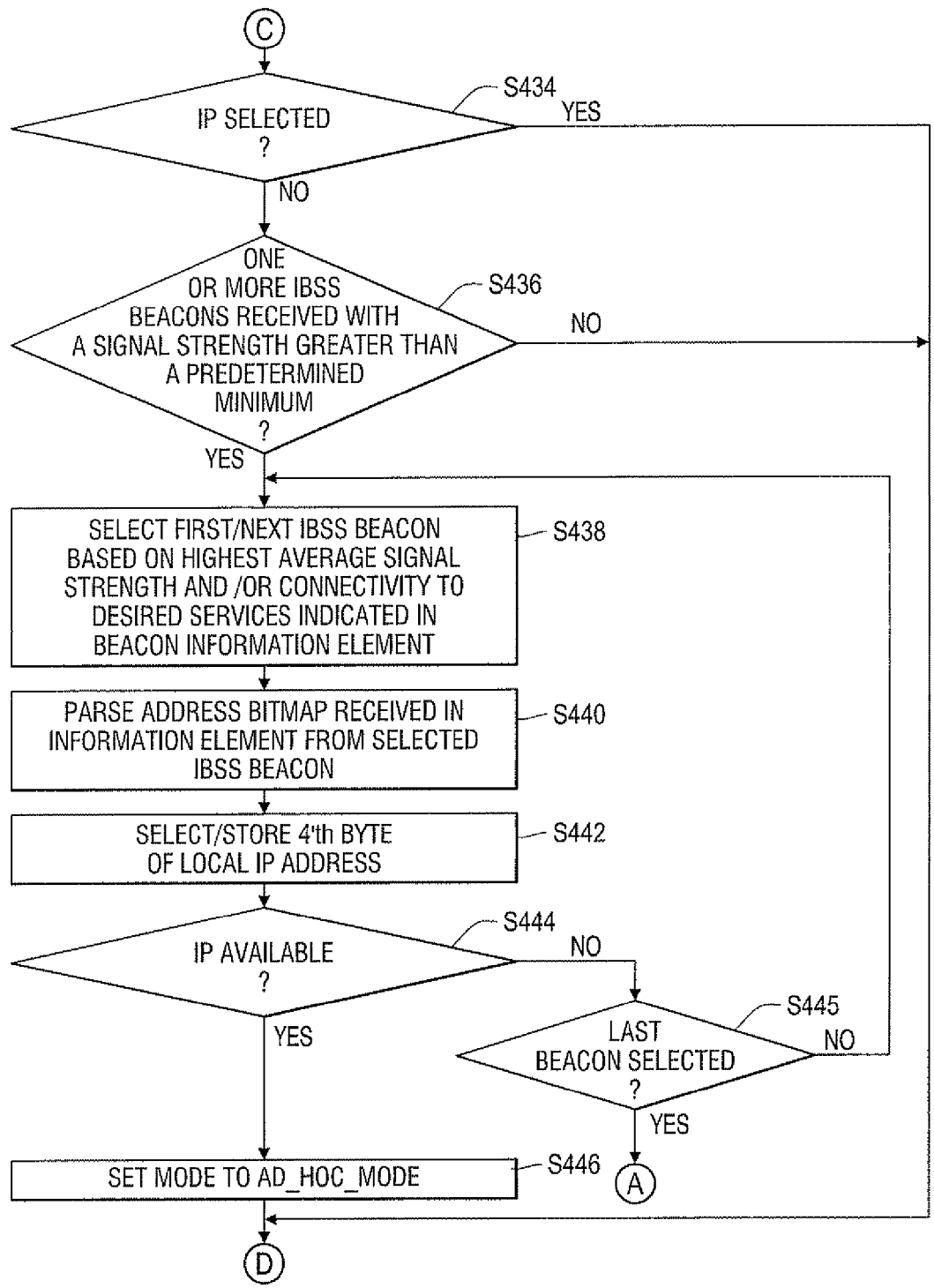
Figure 7:
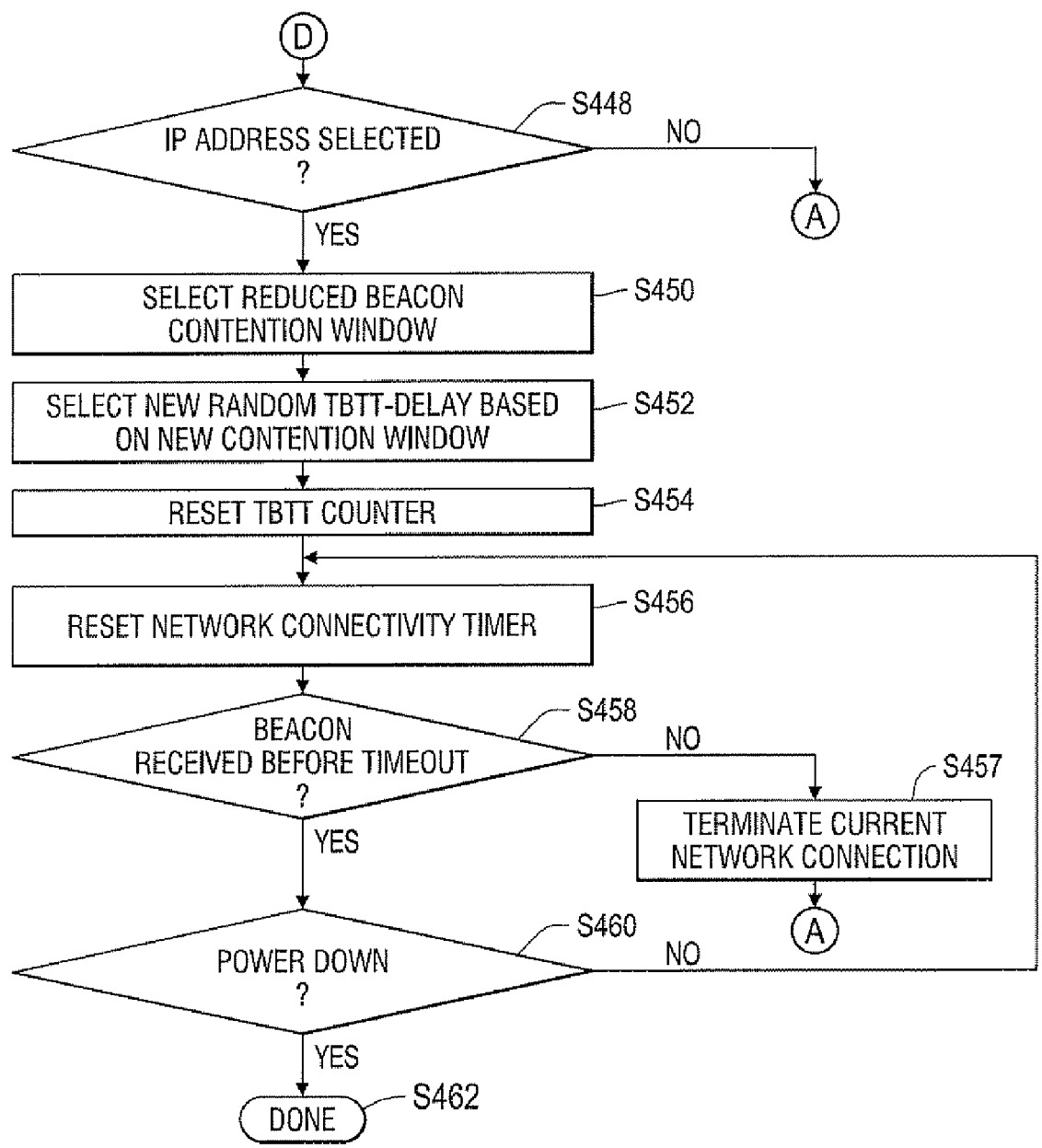

FIG. 4, FIG. 5, FIG. 6 and FIG. 7 are flow diagrams of an example startup and initial network connection process executed by an embodiment of a station that supports simplified auto-configuration and service discovery in both infrastructure mode networks and ad-hoc networks. As shown in FIG. 4, operation of the process may begin at step S402 with a power-up or processor restart of the station and processing proceeds to step S404.

In step S404, the controller 102 may retrieve from the non-volatile memory 106 stored control parameters used for control of the station 100, and processing proceeds to step S406.

In step S406, the controller 102 may instruct the local data store unit 112 to initiate a local data store, as described above with respect to Table 1. Although no messages from peer stations may have been received, the local data store may be updated to include an entry for the station 100 that may be populated with default control parameters retrieved from the non-volatile memory 106. Such parameters may include UUID's of services that may be provided by the station 100, a user-friendly name assigned to the station 100, etc., and processing proceeds to step S408. The controller 102 may also retrieve from the non-volatile memory 106 additional control parameters related to the station's control and operation of a network connection. For example, such control parameters may include, an assigned MAC address, a default TBTT, a default pre-TBTT time offset, a default BSS/IBSS beacon contention window, etc.

In step S408, the controller 102 may instruct the clock control unit 104 to initiate a startup timer for a predetermined period of time, e.g., 30 seconds, and processing proceeds to step S410.

If, in step S410, the controller 102 determines that a message has been received from a peer station, operation of the process continues to step S412, otherwise, operation of the process continues to step S418.

In step S412, the message parsing unit 118 may parse the incoming message and may provide the retrieved information, e.g., MAC address, BSS/IBSS timestamp, information element contents, etc., to the controller 102 and/or to the local data store unit 112, and operation of the process continues to step S414.

In step S414, local data store unit 112 may update the local data store to include the newly received information. For example, if the message is received from a station from which a message has previously been received and stored in the local data store, an existing record in the local data store may be updated. However, if the message is received from a station from which a message has not previously been received, a new record in the local data store may be created, as described above with respect to Table 1, and operation of the process proceeds to step S416.

In step S416, the controller 102 may set, or reset, an IP address aging timer for the peer station from which the message was received, as described in greater detail below with respect to FIG. 9, and operation of the process continues to step S418.

If, in step S418, the controller 102 determines that the previously set startup period timer has expired, operation of the process proceeds to step S419, otherwise, operation of the process proceeds to step S410.

If, in step S419, the controller 102 determines that a message was received during the startup period, operation of the process proceeds to step S420, otherwise, operation of the process proceeds to step S408.

In step S420, the controller 102 may instruct the local data store unit 112 to scan the local data store and to build a list of BSS and IBBS beacons received with a signal strength, e.g., an RSSI measurement, greater that a predetermined minimum, and operation of the process proceeds to step S422.

If, in step S422, the controller 102 determines that beacon messages from one or more BSS access points have been received with a signal strength greater than a predetermined minimum, operation of the process proceeds to step S424, otherwise, operation of the process proceeds to step S434.

In step S424, the controller 102 may select a first/next BSS based on the detected signal strength of the BSS access point, and/or the set of services associated with peer stations accessible via the BSS, and operation of the process proceeds to step S426.

In step S426, the controller 102 may parse the address bitmap received from the selected BSS access point via the BSS beacon message, and stored in association with the BSS access point in the local data store, and operation of the process proceeds to step S428.

In step S428, the controller 102 may select a fourth network address byte and may combine the selected fourth byte with the first three network address bytes associated with the IP address of the selected BSS access point. In this manner, the station may assign itself an available network address in the selected BSS access point, and processing proceeds to step S430.

If, in step S430, the controller 102 determines that an IP address was successfully obtained, operation of the process proceeds to step S432, otherwise, operation of the process proceeds to step S431.

If, in step S431, the controller 102 determines that the last BSS beacon with a signal strength greater than a predetermined signal strength has been selected, operation of the process proceeds to step S434, otherwise, operation of the process proceeds to step S424.

In step S432, the controller 102 may set the mode of the station to infrastructure mode, and operation of the process proceeds to step S434.

If, in step S434, the controller 102 determines that an IP address has been successfully selected and assigned to the station, operation of the process proceeds to step S448, otherwise, operation of the process proceeds to step S436.

If, in step S436, the controller 102 determines that beacon messages from one or more peer stations that are members of ad-hoc IBBS networks have been received with a signal strength greater than a predetermined minimum, operation of the process proceeds to step S438, otherwise, operation of the process proceeds to step S448.

In step S438, the controller 102 may select a first/next IBSS connected station based on the detected signal strength of the IBSS station, and/or the set of services associated with peer stations accessible via the ad-hoc IBSS network, and operation of the process proceeds to step S440.

In step S440, the controller 102 may instruct the address bitmap generator 114 to parse the local data store and to generate a combined network-address-in-use bitmap based on network-address-in-use bitmaps received from peer stations connected to the same selected ad-hoc IBSS network, and operation of the process proceeds to step S442.

In step S442, the controller 102 may select, based on the generated network-address-in-use bitmap, a fourth network address byte and may combine the selected fourth byte with the first three network address bytes assigned to each of the other stations connected to the selected ad-hoc IBSS network to form a unique IP address that is not in use on the selected ad-hoc IBSS network. In this manner, the station may assign itself an available network address in the selected ad-hoc IBSS network, and processing proceeds to step S444.

If, in step S444, the controller 102 determines that an IP address was successfully obtained, operation of the process proceeds to step S446, otherwise, operation of the process proceeds to step S445.

If, in step S445, the controller 102 determines that the last IBSS beacon with a signal strength greater than a predetermined signal strength has been selected, operation of the process proceeds to step S408, otherwise, operation of the process proceeds to step S438.

In step S446, the controller 102 may set the mode of the station to ad-hoc mode, and operation of the process proceeds to step S448.

If, in step S448, the controller 102 determines that an IP address has been successfully selected and assigned to the station, operation of the process proceeds to step S450, otherwise, operation of the process proceeds to step S408.

In step S450, the controller 102 may set a beacon contention window that is shorter in duration than the default BSS/IBSS beacon contention window, and operation of the process proceeds to step S452.

In step S452, the controller 102 may select a new random TBTT-delay based on the shortened beacon contention window, and operation of the process proceeds to step S454.

In step S454, the controller 102 may set/reset a TBTT counter to zero and operation of the process proceeds to step S456.

In step S456, the controller 102 may set/reset a network connectivity timer that is used to monitor whether the network connection established by the station has been lost, as described in greater detail below, and operation of the process proceeds to step S458.

If, in step S458, the controller 102 determines that a network beacon message has been received prior to a timeout of the network connectivity timer, operation of the process proceeds to step S460, otherwise, operation of the process proceeds to step S457.

In step S457, the controller 102 may terminate the station's current network connection, and operation of the process proceeds to step S408.

If, in step S460, the controller 102 determines that a power-down or restart request has been received, operation of the process proceeds to step S462 and the process terminates, otherwise, operation of the process proceeds to step S456.

It is noted that in steps S456 through S460 described above, monitoring of network connectivity based on the network connectivity timer is performed in parallel with the operation of other processes performed by the station, for example, as describe below with respect to FIG. 8 through FIG. 16.

It is noted that in steps S450 through S454 described above, the controller 102 reduces its beacon contention window in order to increase the likelihood that it will be allowed to transmit a beacon at an upcoming TBTT. For example, decreasing the beacon contention window increases the probability that the random TBTT-delay, generated in step S452, will be shorter than the random TBTT-delay generated by another station. This increases the likelihood that the station will be allowed to transmit its beacon message at the next TBTT, as described in greater detail with respect to FIG. 8, FIG. 9 and FIG. 10, below.

Figure 8:
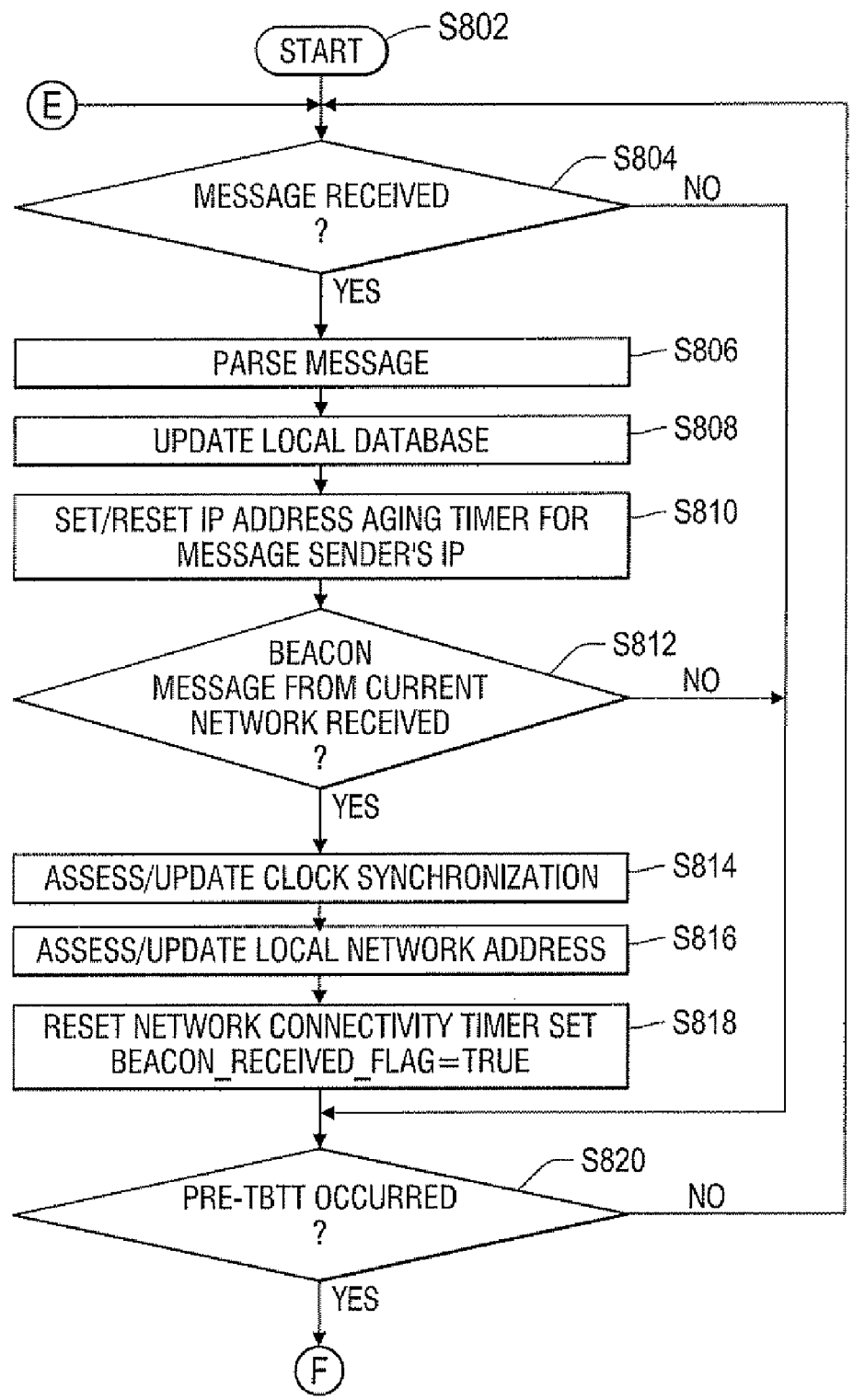
FIG. 8, FIG. 9 and FIG. 10 are a flow diagram of an example wireless message receiving process executed by an embodiment of the station of FIG. 1.
Figure 9:
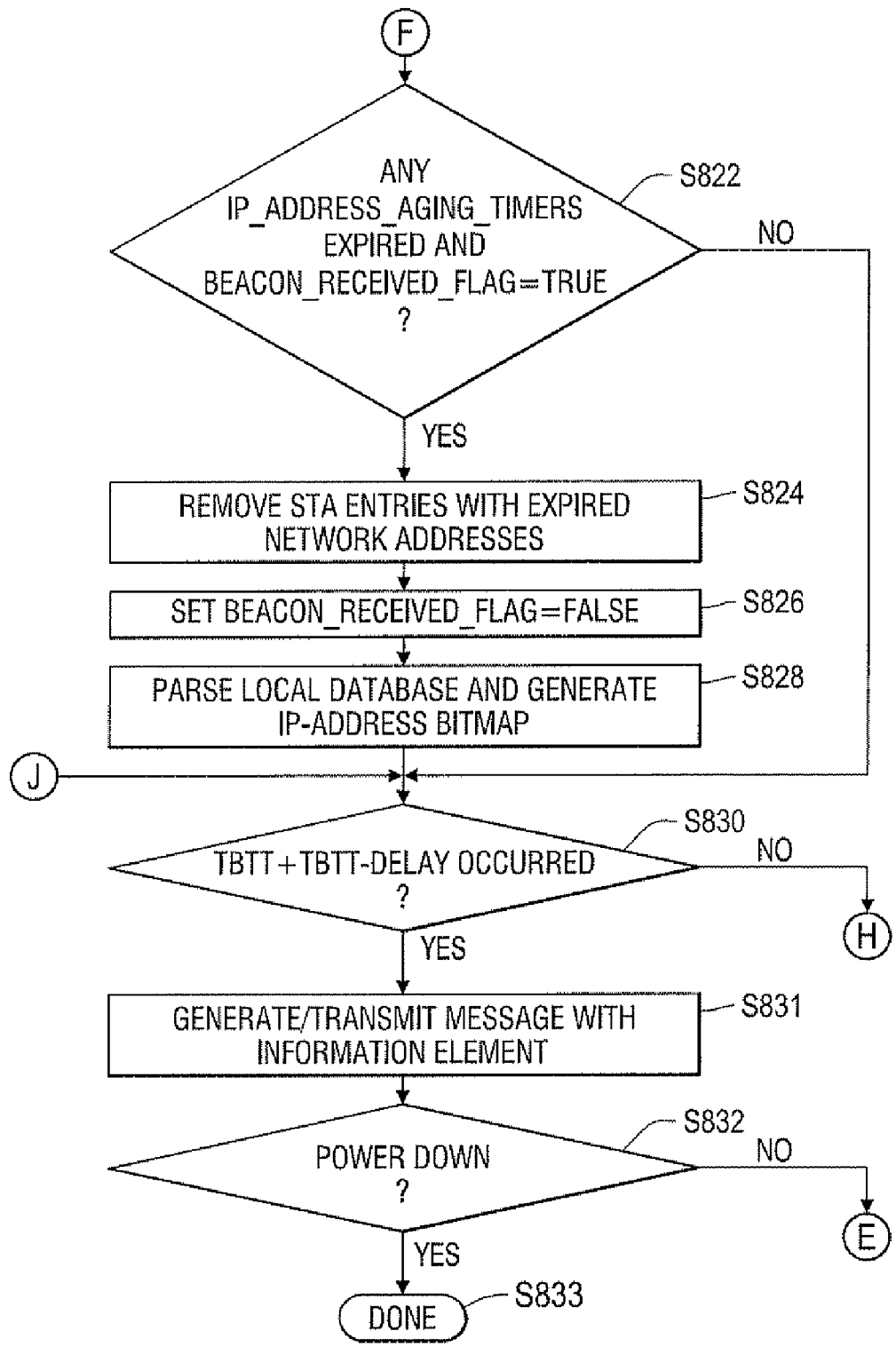
Figure 10:
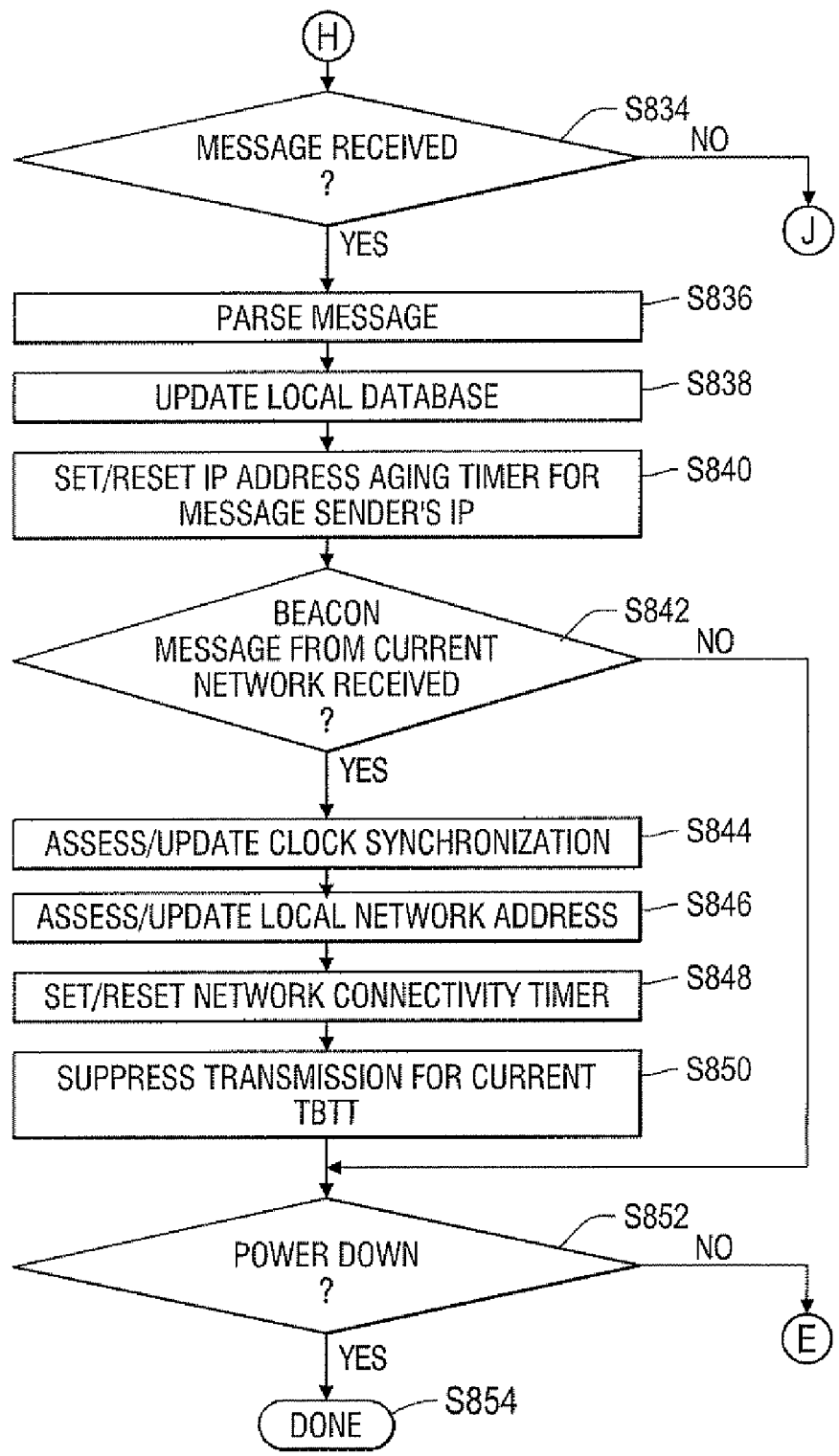

FIG. 8, FIG. 9 and FIG. 10 present flow diagrams of an example process that may be used to control operation of a station that has joined either an ad-hoc mode network or an infrastructure mode network that supports simplified auto-configuration and service discovery. The process below assumes that the ad-hoc or infrastructure network has stabilized and that TBTT and pre-TBTT timeouts are periodically generated by the clock control unit 104 based on a clock that is synchronized with peer stations in the network. As shown in FIG. 8, operation of the process may begin at step S802 and processing proceeds to step S804.

If in step S804, the controller 102 determines that a message, e.g., a beacon, probe-request, public action frame, or probe-response has been received from a peer station, operation of the process proceeds to step S806, otherwise, if the controller 102 determines that no message has been received, and operation of the process proceeds to step S820.

In step S806, the message parsing unit 118 may parse the received message to retrieve information contained within, including the information element described above with respect to Table 2, and operation of the process proceeds to step S808.

In step S808, the local data store unit 112 may update the local data store with information retrieved from the received message. For example, the local data store may update an existing record to reflect information received in a message, or may create and populate a new record if the message was received from a station from which no messages have previously been received. Further, if a probe-request, or public action frame, is received, the local data store may record that a probe-request, or public action frame, is outstanding for the station that transmitted the message. In addition, if a probe-response is received that addresses an outstanding probe-request, or public action frame, transmitted by the local station or another station, the local data store may be updated to reflect that the probe-request, or public action frame, has been satisfied and that the probe-request, or public action frame, is, therefore, no longer outstanding. Once the local data store is updated in such a manner, operation of the process proceeds to step S810.

In step S810, the controller 102 may set, or reset, an IP address aging timer for the peer station from which the message was received, as described in greater detail below, and operation of the process proceeds to step S812.

If, in step S812, the controller 102 determines that a beacon message has been received from the network to which the station is currently connected, operation of the process proceeds to step S814, otherwise, operation of the process proceeds to step S820.

In step S814, the BSS/IBSS timestamp received with the message is compared with the receiving station's BSS/IBSS clock time and the received timestamp may be used to update the receiving station's BSS/IBSS clock time. For example, if the received timestamp is greater than the receiving station's BSS/IBSS clock time, the controller 102 may adjust the receiving stations BSS/IBSS clock based on the received timestamp. For example, the local BSS/IBSS clock time may be updated to a value based on the received timestamp adjusted for internal processing delays and/or transmission time. Once the received timestamp is assessed, and the local BSS/IBSS time is either verified or updated, operation of the process proceeds to step S816.

In step S816, the last byte of a transmitting station's selected network address may be assessed to determine whether a network address conflict exists between the receiving station's selected network address and the transmitting station's network address, as described in greater detail with respect to FIG. 13, below, and operation of the process proceeds to step S818.

In step S818, the controller 102 may reset the network connectivity timer used to monitor whether the station's current network connection remains active, as described above with respect to FIG. 7 at steps S456 through S460, and the controller 102 may set a Beacon_Received_Flag to TRUE to indicate that a network beacon message has been received, as described in greater detail with respect to step S822 to step S828, below, and operation of the process proceeds to step S820.

If, in step S820, the controller 102 determines that a pre-TBTT timeout has occurred, operation of the process proceeds to step S822, otherwise, operation of the process proceeds to step S804.

If, in step S822, the controller 102 determines that an IP_Address_Aging_Timer associated with a peer station has expired, and the Beacon_Received_Flag is set to TRUE indicating that a beacon signal from the station's current network connection has recently been received, operation of the process proceeds to step S824, otherwise, operation of the process proceeds to step S830.

In step S824, the controller 102 may instruct the local data store unit 112 to remove from the local data store all station entries with an expired network address, and operation of the process proceeds to step S826.

In step S826, the controller 102 may reset the Beacon_Received_Flag to FALSE, and operation of the process proceeds to step S828.

In step S828, the controller 102 may instruct the network-address bitmap generator 114 to parse the local data store unit 112 and to generate a network-address-in-use bitmap, as described above, that indicates which of the available network addresses, e.g., between 0 and 255, have been allocated to stations within the ad-hoc network. As addressed above, the network-address-in-use bitmap may be compressed using any number of allocation strategies and/or compression techniques. Once the network-address-in-use bitmap has been generated, operation of the process proceeds to step S830.

In step S830, the controller 102 may determine whether a TBTT plus TBTT delay time has occurred. Such a timeout may be determined based on the BSS/IBSS TBTT time extended by a random TBTT delay period that may be independently generated by each station in the network based on either a default BSS/IBSS beacon contention window, or a shortened contention window selected by a station. For example, the TBTT delay may be randomly generated by each peer station for each subsequent TBTT. In this manner, over a period of time that includes a large number of TBTTs, each peer station will have a statistically equal chance of transmitting a message an equal number of times as other stations in the network. If, in step S830, the controller 102 determines that a TBTT plus TBTT delay timeout has occurred, operation of the process proceeds to step S831, otherwise, operation of the process proceeds to step S834.

In step S831, the controller 102 may instruct the message generating unit 116 to generate and transmit a message, e.g., a beacon, probe-request, public action frame, probe-response, etc., that includes the information element described above with respect to Table 2. Processing related to determining the type of message to generate and transmit is addressed in greater detail below with respect to FIGS. 14-16. Once a message has been transmitted, operation of the process proceeds to step S832.

If, in step S832, the controller 102 determines that a power-down or restart has been requested, operation of the process proceeds to step S833 and the process terminates, otherwise, operation of the process proceeds to step S804.

As addressed above, if in step S830 a TBTT plus TBTT delay timeout has not occurred, processing proceeds to step S834. In step S834, the controller 102 may determine whether a message has been received from a peer station. If a message has been received from a peer station, processing proceeds to step S836, otherwise, operation of the process proceeds to step S830.

In step S836, the message parsing unit 118 may parse the received message to retrieve information contained within, including the information element described above with respect to Table 2, and operation of the process proceeds to step S838.

In step S838, the local data store unit 112 may update the local data store with information retrieved in the received message, and operation of the process proceeds to step S840.

In step S840, the controller 102 may set, or reset, an IP address aging timer for the peer station from which the message was received, and operation of the process proceeds to step S842.

If, in step S842, the controller 102 determines that a beacon message has been received from the network to which the station is currently connected, operation of the process proceeds to step S844, otherwise, operation of the process proceeds to step S852.

In step S844, the BSS/IBSS timestamp received with the message is compared with the receiving station's BSS/IBSS clock time and the received timestamp may be used to update the receiving station's BSS/IBSS clock time, and operation of the process proceeds to step S846.

In step S846, the last byte of a transmitting station's selected network address may be assessed to determine whether a network address conflict exists between the receiving station's selected network address and the transmitting station's network address, as described in greater detail with respect to FIG. 13, below, and operation of the process proceeds to step S848.

In step S848, the controller 102 may reset the network connectivity timer for the current network, and operation of the process proceeds to step S850.

In step S850, the controller 102 may update a local control parameter to suppress transmission of a message by the station for the current TBTT. In such an embodiment, only a single station in the current network may be allowed to transmit a beacon signal at each TBTT. As addressed above, by using such an approach over a period of time that includes a large number of TBTTs, each peer station in a network will have a statistically equal chance of transmitting a message an approximately equal number of times as other stations in network. Once message transmission for the station has been suppressed for the current TBTT, operation of the process proceeds to step S852.

If, in step S852, the controller 102 determines that a power-down or restart has been requested, operation of the process proceeds to step S854 and the process terminates, otherwise, operation of the process proceeds to step S804.

Figure 11:
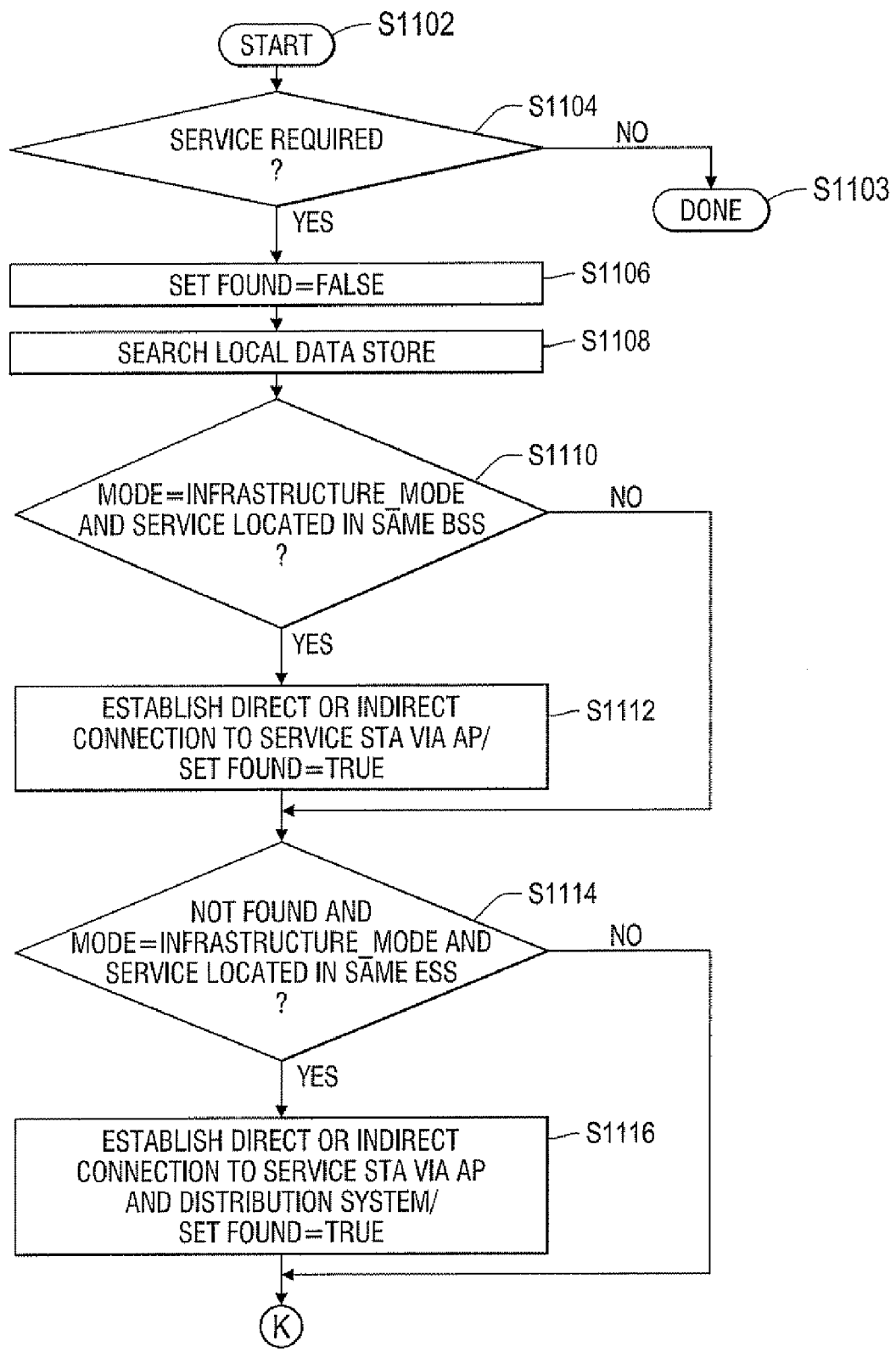
FIG. 11 and FIG. 12 are a flow diagram of an example service location and wireless network service connection process executed by an embodiment of the station of FIG. 1.
Figure 12:
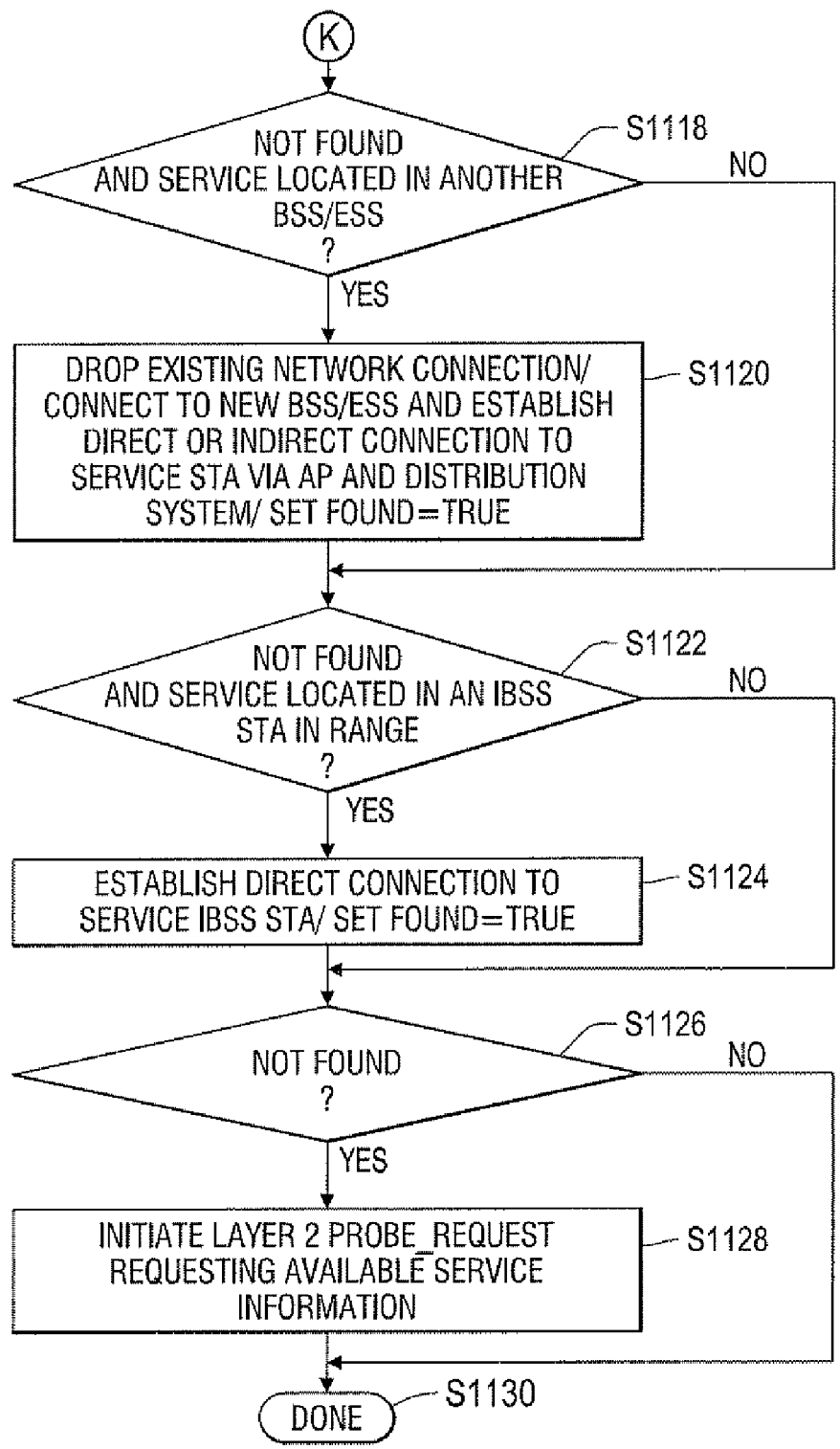

FIG. 11 and FIG. 12 are flow diagrams of an example service location and wireless network service connection process that may be performed by the network service connection unit 120, working with the controller 102 and the local data store unit 112, to locate services desired by station 100 via any available ad-hoc or infrastructure based network and to switch connectivity of station 100 to the located service providing peer station. As shown in FIG. 11, operation of the process may begin at step S1102 and processing proceeds to step S1104.

If in step S1104, the network service connection unit 120 determines that station 100 desires a service that may be available via a peer station, operation of the process proceeds to step S1106, otherwise, operation of the process proceeds to step S1103, and the process terminates.

In step S1106, the network service connection unit 120 may set a Found_Flag to FALSE, and operation of the process proceeds to step S1108.

In step S1108, the network service connection unit 120 working with the local data store unit 112 may initiate a search of peer station services identified in association with the respective peer stations in the local data store, and operation of the process proceeds to step S1110.

If, in step S1110, the network service connection unit 120 determines that station 100 is in infrastructure mode and the network service connection unit 120 locates the desired service in the same infrastructure mode BSS to which station 100 is currently connected, operation of the process proceeds to step S1112, otherwise, operation of the process proceeds to step S1114.

In step S1112, the network service connection unit 120 may set the Found_Flag to TRUE, and may communicate to the controller 102 the identity and network affiliation of the peer station providing the desired service. Since station 100 and the located peer station share a common BSS access point, the controller 100 may establish an indirect wireless connection to the located peer station via their common BSS access point, and, if the two stations are within transmission range of one another, station 100 may establish a direct wireless connection to the service providing peer station, and operation of the process proceeds to step S1114.

If, in step S1114, the network service connection unit 120 determines that the Found_Flag is FALSE, station 100 is in infrastructure mode and the network service connection unit 120 locates the desired service in the same infrastructure mode extended service set (ESS), to which station 100 is currently connected, operation of the process proceeds to step S1116, otherwise, operation of the process proceeds to step S1118.

In step S1116, the network service connection unit 120 may set the Found_Flag to TRUE, and may communicate to the controller 102 the identity and network affiliation of the peer station providing the desired service. Since station 100 and the located peer station belong to a common extended service set (ESS), the controller 102 may establish an indirect wireless connection to the located peer station via the two or more base service set (BSS) access points that connect their respective base service sets (BSS) to form the extended service set (ESS), and, if the two stations are within transmission range of one another, station 100 may establish a direct wireless connection to the service providing peer station, and operation of the process proceeds to step S1118.

If in step S1118, the network service connection unit 120 determines that the Found_Flag is FALSE, station 100 is in infrastructure mode and the network service connection unit 120 locates the desired service in an infrastructure mode base service set (BSS) or extended service set (ESS), to which station 100 is not currently connected, operation of the process proceeds to step S1120, otherwise, operation of the process proceeds to step S1122.

In step S1120, the network service connection unit 120 may set the Found_Flag to TRUE, and may communicate to the controller 102 the identity and network affiliation of the peer station providing the desired service. Since station 100 and the located peer station do not belong to a common base service set (BSS) or extended service set (ESS), the controller 102 may disconnect its current network connection and connect to the same infrastructure network to which the located service providing network belongs. Once connected to a common BSS/ESS, the controller 102 may establish an indirect wireless connection to the located peer station via the one or more base service set (BSS) access points that connect the respective stations to the common infrastructure network, and, if the two stations are within transmission range of one another, station 100 may establish a direct wireless connection to the service providing peer station, and operation of the process proceeds to step S1122.

If, in step S1122, the network service connection unit 120 determines that the Found_Flag is FALSE and the network service connection unit 120 locates the desired service in an ad-hoc network independent base service set (IBSS) and the service providing peer station is within range of station 100, operation of the process proceeds to step S1124, otherwise, operation of the process proceeds to step S1126.

In step S1124, the network service connection unit 120 may set the Found_Flag to TRUE, may drop any existing network connection, and may join the ad-hoc IBSS network to which the service providing station belongs. Once connected to the common IBSS network, station 100 may establish an ad-hoc direct wireless connection to the service providing peer station, and operation of the process proceeds to step S1126.

If, in step S1126, the network service connection unit 120 determines that the Found_Flag is FALSE, operation of the process proceeds to step S1128, otherwise, operation of the process proceeds to step S1130 and the process terminates.

In step S1130, the controller 102 may initiate a layer 2 probe request with an information element requesting location of the desired service, operation of the process proceeds to step S1130 and the process terminates.

Figure 13:
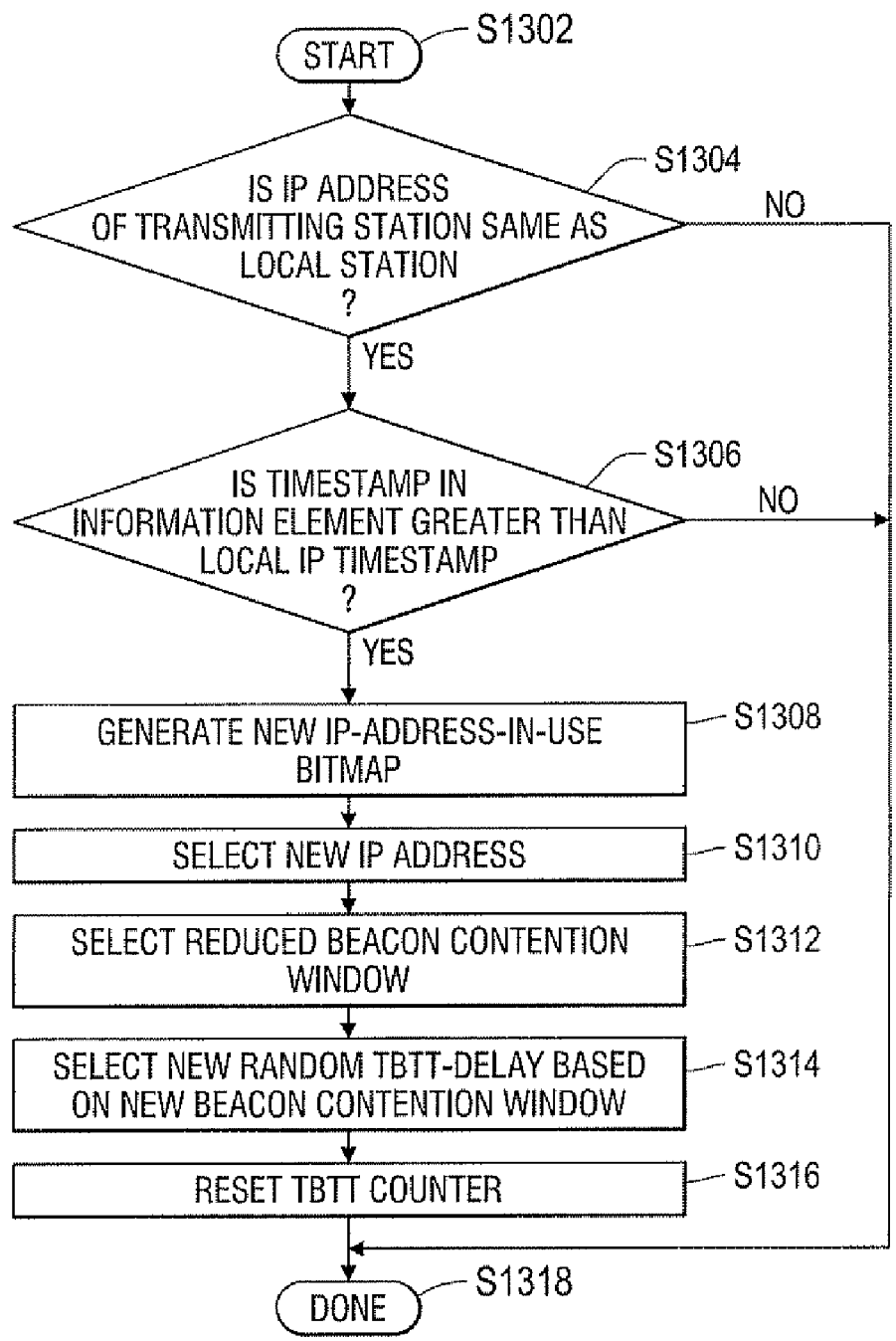
FIG. 13 is a flow diagram of an example service IP address correction process executed by an embodiment of the station of FIG. 1.

FIG. 13 is a flow diagram of an example process executed by a station to detect and correct a network address conflict. The process described below with respect to FIG. 13 is referred to above with respect to FIG. 8 at step S816, and may be executed to assess the validity of the network address assigned to the local station each time a message from a peer station is received. Such an approach assures that the network address selected by the local station is unique among peer stations connected to the network.

As shown in FIG. 13, operation of the process may begin at step S1302 and operation of the process proceeds to step S1304.

In step S1304, the controller 102 may assess the IP network address of a transmitting peer station, as received in the information element included in a message received from the transmitting peer station. If the IP network address of the transmitting station's network address matches the IP network address of the network address selected by the receiving station, operation of the process proceeds to step S1306, otherwise, operation of the process proceeds to step S1318 and the process terminates.

In step S1306, the controller 102 may assess the 4-byte timestamp received in the information element included in the message received from the transmitting peer station. As described above with respect to Table 2, the 4-byte timestamp may represent the number of milliseconds since the transmitting peer station selected the network address. If the controller 102 of the receiving station determines that the value in the 4-byte timestamp received in the information element from a peer station is greater than the number of milliseconds since the receiving station selected the network address, operation of the process proceeds to step S1308, otherwise operation of the process proceeds to step S1318 and the process terminates.

In step S1308, the controller 102 may instruct the address bitmap generator 114 to generate a new network-address-in-use bitmap for the current network to which station 100 is connected. The new network-address-in-use bitmap may include the network-address-in-use bitmap information received in the information element included in the message used to identify the network address conflict, as described above, and operation of the process proceeds to step S1310.

In step S1310, the controller 102 may select a new network address that includes the first three bytes of the prior assigned IP address plus a new fourth byte selected based on the information contained within the updated network-address-in-use bitmap, and operation of the process proceeds to step S1312.

In step S1312, the controller 102 may select a reduced beacon contention window. As described above, reducing the contention window of a station in an ad-hoc network increases the likelihood that a message generated by the station will be transmitted following upcoming TBTTs. Once the beacon contention window is reduced, operation of the process proceeds to step S1314.

In step S1314, the controller 102 may select a new random TBTT-delay based on the reduced beacon contention window. By reducing the beacon contention window and generating a new random TBTT-delay, the station may increase its chance that a small random TBTT-delay may be selected, and may thereby increase the likelihood that it will be allowed to transmit a message that includes its new network address at an upcoming TBTT. Once a new TBTT-delay is selected, operation of the process proceeds to step S1316.

In step S1316, the controller 102 may reset a TBTT counter to zero. As addressed in greater detail below, the TBTT counter may be incremented each time a TBTT occurs and the local station is using a reduced beacon contention window. Once the contention window has been reduced for a predetermined number of TBTTs, the contention window may be restored to a default IBSS beacon contention window. Once the TBTT counter has been set to zero, processing proceeds to step S1318 and the process terminates.

Figure 14:
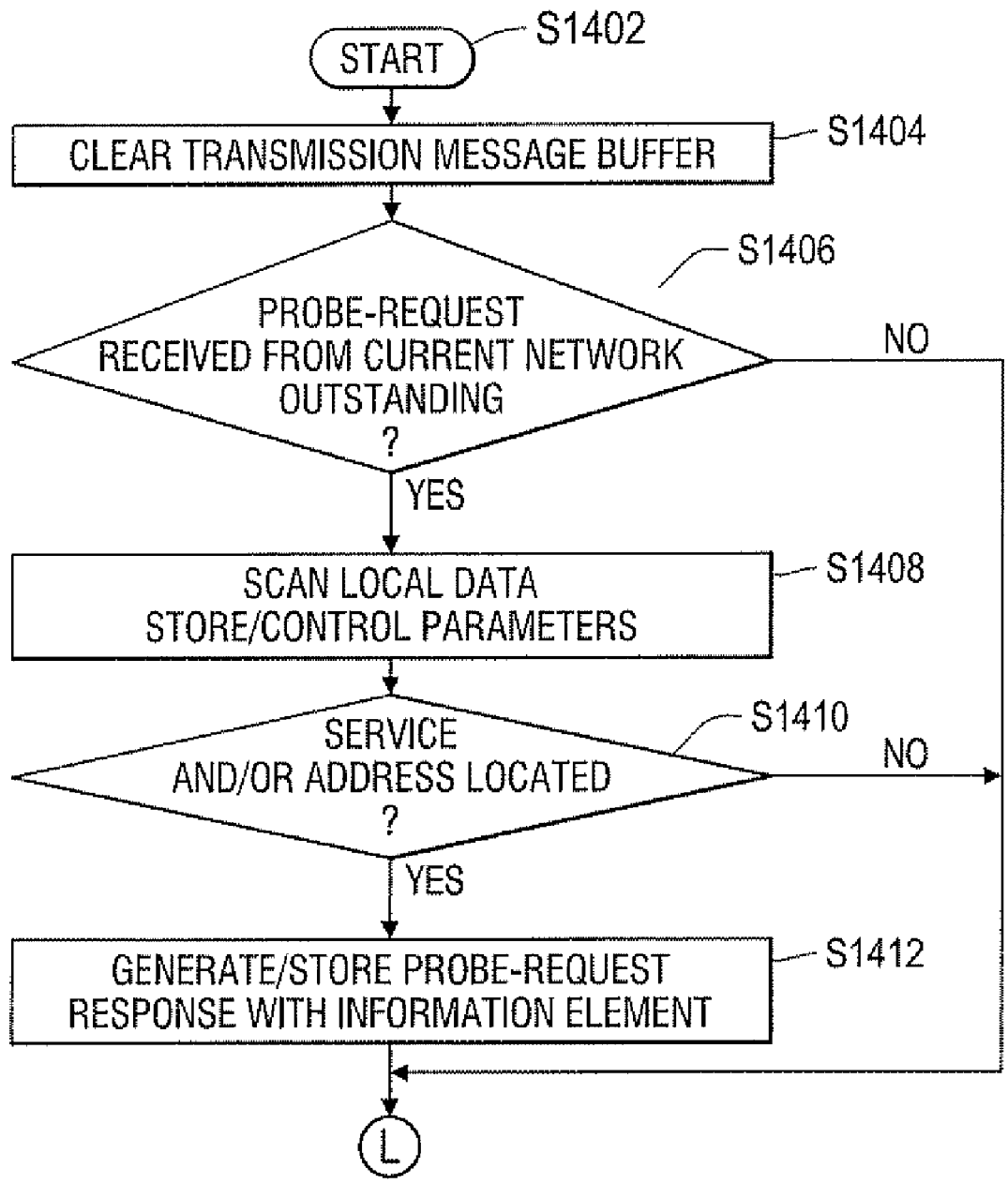
FIG. 14, FIG. 15 and FIG. 16 are a flow diagram of an example process executed by an embodiment of the station of FIG. 1 to generate messages for wireless transmission.
Figure 15:
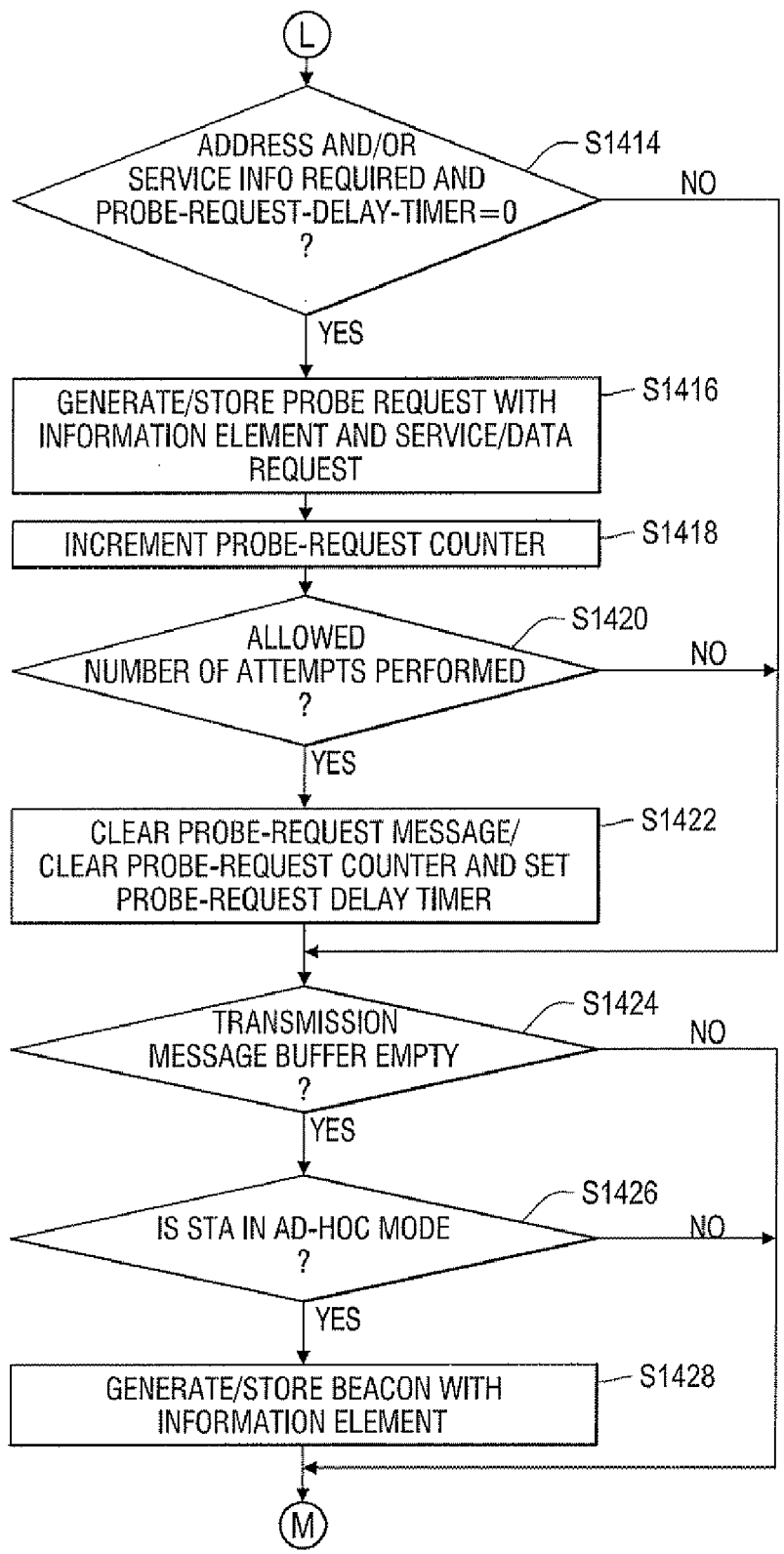
Figure 16:
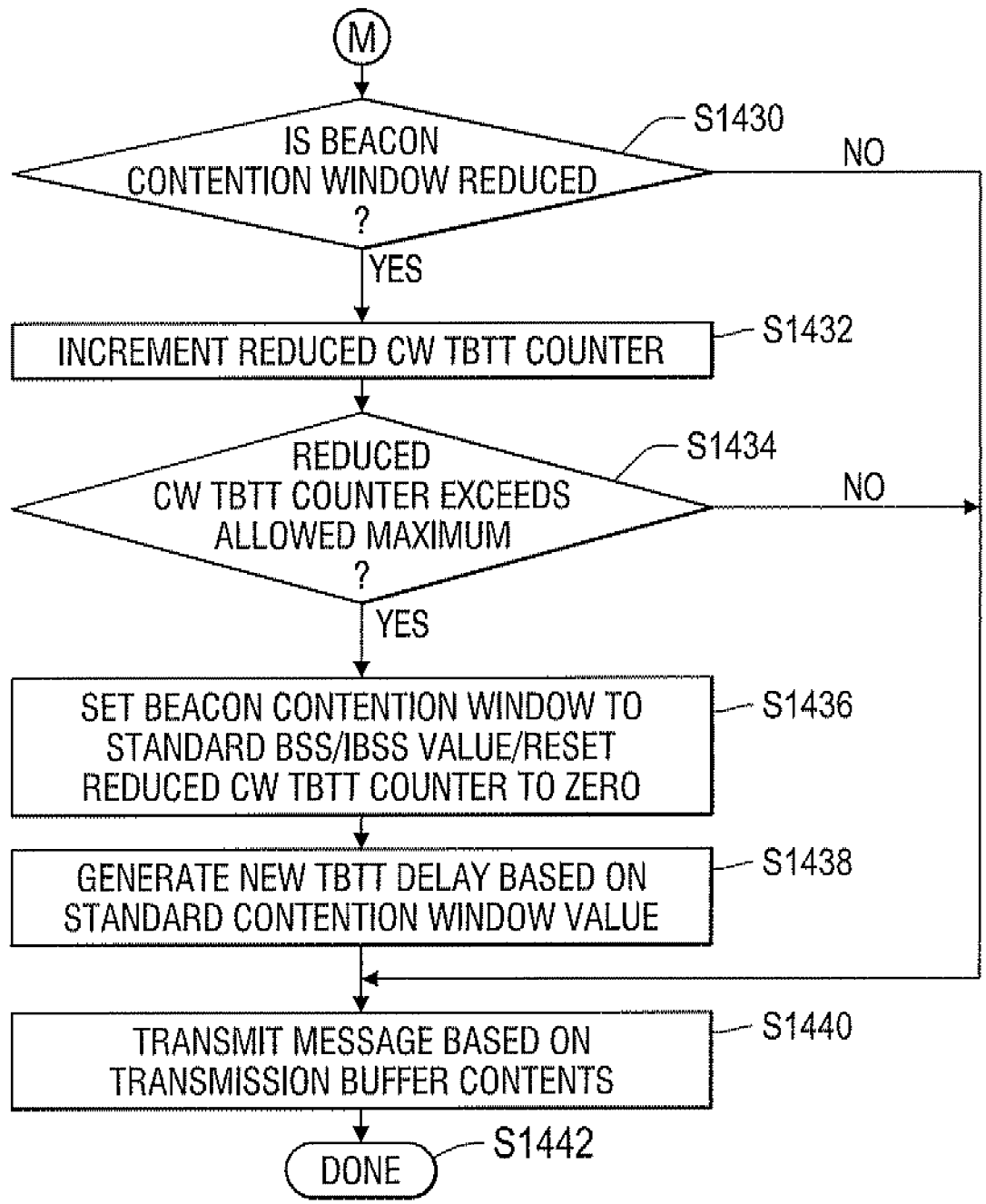

FIG. 14, FIG. 15, and FIG. 16 present flow diagrams of an example process executed by a station to generate a message, e.g., a beacon, a probe-request, a public action frame, a probe-response, etc., for transmission to peer stations that may belong to either ad-hoc or infrastructure networks via layer 2 based messages. The process described below with respect to FIG. 14 through FIG. 16 corresponds to processing described above with respect to FIG. 9 at step S831.

As shown in FIG. 14, operation of the process may begin at step S1402 and operation of the process proceeds to step S1404.

In step S1404, the controller 102 may instruct the message generating unit 116 to clear a transmission message buffer that is used to store components to be included in an outgoing message, and operation of the process proceeds to step 1006.

In step S1406, the controller 102 may scan local control parameters and/or may scan the local data store to determine whether a probe-request, or public action frame, received from a peer station, within the ad-hoc or infrastructure network to which station 100 is currently connected, remains outstanding. If a probe-request, or public action frame, is outstanding, operation of the process proceeds to step S1408, otherwise, operation of the process proceeds to step S1414.

In step S1408, the controller 102 may scan the local data store, and/or control parameters maintained in volatile memory, to determine whether the local station holds information and/or is capable of providing services and/or information requested by the probe-request, or public action frame, and operation of the process proceeds to step S1410.

If, in step S1410, the controller 102 determines that the local station holds information and/or is capable of providing services requested by the probe-request, or public action frame, operation of the process proceeds to step S1412, otherwise operation of the process proceeds to step S1414.

In step S1412, the controller 102 may instruct the message generating unit 118 to generate a probe-response and to store the generated probe-response within the transmission message buffer. For example, if the probe-request, or public action frame, included a list of desired service UUIDs, and the controller 102 determines that the receiving station or a peer station listed in the receiving station's local data store may provide the requested service, the controller 102 may instruct the message generating unit 118 to construct a probe-response containing records retrieved from the local data store pertaining to the one or more stations capable of providing the desired service. Similarly, if the probe-request, or public action frame, included a list of user-friendly names, and the controller 102 determines that one of the received user-friendly names corresponds to the receiving station or a peer station listed in the receiving station's local data store, the controller 102 may instruct the message generating unit 118 to construct a probe-response containing records retrieved from the local data store pertaining to the one or more desired user-friendly names. In such a manner, the receiving station may efficiently provide both a name resolution service and a service discovery service for peer stations of the ad-hoc network. Once the message generating unit 118 has generated the probe-response and stored the generated probe-response within the transmission message buffer, operation of the process proceeds to step S1414.

If, in step S1414, the controller 102 determines that a network address of one or more peer stations are needed, and/or determines that a desired service needs to be located within available peer station ad-hoc and/or infrastructure networks, and/or decides any other information is required from peer stations that may be addressed by issuing a probe-request, or public action frame, and any probe-request-delay-timer, if previously set, has expired, operation of the process proceeds to step S1416, otherwise, operation of the process proceeds to step S1424.

In step S1416, the controller 102 may instruct the message generating unit 116 to generate, and store within the transmission message buffer, a probe-request message, or public action frame, containing parameters requesting the needed information and the information element described above with respect to Table 2, and operation of the process proceeds to step S1418.

In step S1418, the controller 102 may increment a probe-request counter that may be used to track how many times a probe-request, or public action frame, has been issued, and operation of the process proceeds to step S1420.

If in step S1420, the controller 102 determines that a pre-determined number of probe-requests, or public action frames, has been reached, processing proceeds to step S1422, otherwise, operation of the process proceeds to step S1424.

In step S1422, the controller 102 may clear the probe-request, or public action frame, from the message buffer, may clear the probe-request counter and may set the probe-request delay timer addressed, above with respect to step S1414, to a pre-determined period of time, e.g., 30 seconds. Using such an approach, once the station determines that information is needed and generates a first probe-request, or public action frame, a probe-request, or public action frame, may be transmitted up to a predetermined number of times, e.g., 2, 4, 6 or any other integer N, based on a pre-configured default control parameter. For example, the pre-configured default control parameter may be stored in the station's memory at startup, and/or may be a user configurable control parameter, and/or may be based on a shared IBSS control parameter that may be statically determined by the first station in the ad-hoc network, and/or that may be dynamically determined based on information stored in a station's local data store, e.g., based on the number of stations currently in the network. However, if no probe-response, or public action frame, is received that addresses the probe-request, or public action frame, after a predetermined number of transmission, further probe-requests, or public action frames, may be blocked for a period of time in order to allow the station to respond to outstanding probe-requests, or to outstanding public action frames, from peer stations and to allow peer stations a period of time in which to respond to the issued probe-requests, or public action frames. However, after the probe-request delay timer expires, further probe-request messages, or public action frames, may be issued based on whatever information is desired by the local station at that time, based on a review of its local data store and/or local control parameters. Once the probe-request counter has been cleared and the probe-request delay timer has been set, operation of the process proceeds to step S1424.

In step S1424, if the controller determines that the transmission message buffer is empty, operation of the process proceeds to step S1426, otherwise, operation of the process proceeds to step S1430.

If, in step S1426, the controller 102 determines that the station is in ad-hoc mode, operation of the process proceeds to step S1426, otherwise, operation of the process proceeds to step S1430.

In step S1428, the controller 102 may instruct the message generating unit 116 to generate and store in the transmission message buffer a beacon message that includes the information element described above with respect to Table 2, and operation of the process proceeds to step S1430.

In step S1430, the controller 102 may determine whether the local station is operating with a reduced contention window. This may be performed, for example, by either checking a control parameter that indicates whether a reduced contention window has been set, or by comparing the default BSS/IBSS beacon contention window to the contention window that is currently in use. If in step S1430, the controller 102 determines that a reduced contention window is in use, operation of the process proceeds to step S1432, otherwise operation of the process proceeds to step S1440.

In step S1432, the controller 102 may increment a reduced contention window TBTT counter that may be used to track the number of TBTTs that a reduced contention window has used, and operation of the process proceeds to step S1434.

If, in step S1434, the controller 102 determines that the reduced contention window TBTT counter is greater than an allowed maximum, operation of the process proceeds to step S1436, otherwise, operation of the process proceeds to step S1440.

In step S1436, the controller 102 may set the beacon contention window used by the local station to the default BSS/IBSS beacon contention window and may set the reduced contention window TBTT counter to zero, and operation of the process proceeds to step S1438.

In step S1438, the controller 102 may generate a new random TBTT delay based on the default IBSS beacon contention window, and operation of the process proceeds to step S1440.

In step S1440, the controller 102 may instruct the message generating unit 116 to send the contents of the transmission message buffer to the network physical layer unit 110 for transmission, and operation of the process proceeds to step S1442.

For purposes of explanation, in the above description, numerous specific details are set forth in order to provide a thorough understanding of the described ad-hoc mode and infrastructure mode networks that support simplified auto-configuration and service discovery. It will be apparent, however, to one skilled in the art that the described ad-hoc mode and infrastructure mode networks with simplified auto-configuration and service discovery may be practiced without these specific details. In other instances, well-known structures and devices are shown in block diagram form in order to avoid obscuring the features of the described ad-hoc mode and infrastructure mode network approach.

While the described infrastructure and ad-hoc networks with simplified auto-configuration and service discovery have been described in conjunction with the specific embodiments thereof, it is evident that many alternatives, modifications, and variations will be apparent to those skilled in the art. Accordingly, embodiments of the described infrastructure and ad-hoc networks with simplified auto-configuration and service discovery as set forth herein are intended to be illustrative, not limiting. There are changes that may be made without departing from the spirit and scope of the invention.

For example, it is to be understood that various functions of the described stations that support embodiments of the described infrastructure and ad-hoc networks with simplified auto-configuration and service discovery may be distributed in any manner among any quantity (e.g., one or more) of hardware and/or software modules or units that may be interconnected with circuitry and/or software interfaces.

The described stations that support embodiments of the described infrastructure and ad-hoc networks with simplified auto-configuration and service discovery may be integrated within virtually any portable and/or stationary device including, but not limited to, cell phones, personal digital assistants, laptop computers, workstation computers, printers, scanners, network routers and/or other access points to local and/or wide area networks, cameras, child tracking/monitoring devices etc. Further, the described stations may also be integrated within devices such as household/office/factory equipment including, but not limited to, refrigerators, heating and cooling systems, lock mechanisms, fire alarms and/or other security/safety monitoring devices, lighting systems, environmental monitoring systems, etc. The described stations that support embodiments of the described infrastructure and ad-hoc networks may be integrated within any device from which a user benefit may be derived by passing information to and/or receiving information from the device.

The described stations that support embodiments of the described infrastructure and ad-hoc networks with simplified auto-configuration and service discovery may include any commercially available operating system (e.g., Windows, OS/2, Unix, Linux, DOS, etc.), any commercially available and/or custom software (e.g., communication software, etc.) and any types of input/output devices (e.g., keyboard, mouse, probes, I/O port, etc.).

Control software, or firmware, for the described stations that support embodiments of the described infrastructure and ad-hoc networks with simplified auto-configuration and service discovery may be implemented in any desired computer language, and may be developed by one of ordinary skill in the computer and/or programming arts based on the functional description contained herein and illustrated in the drawings. For example, in one example embodiment the described system may be written using the C++ programming language or the JAVA programming language. However, the present invention is not limited to being implemented in any specific programming language or combination of programming languages.

Any software associated with the described stations that support embodiments of the described infrastructure and ad-hoc networks with simplified auto-configuration and service discovery may be distributed via any suitable media (e.g., removable memory cards, CD-ROM, tape or other storage media diskette, ad-hoc network connection). Software and/or default control parameters may be installed in any manner (e.g., an install program, copying files, entering an execute command, etc.).

The described stations that support embodiments of the described infrastructure and ad-hoc networks with simplified auto-configuration and service discovery may accommodate any quantity and any type of data set files and/or databases or other structures containing stored data in any desired format (e.g., ASCII, plain text, or other format, etc.). The format and structure of internal information structures, such as the described local data stores and control parameters, used to hold intermediate information in support of the described stations may include any and all structures and fields and may include, but are not limited to files, arrays, matrices, status and control booleans/variables.

Further, any references herein to software performing various functions generally refer to computer systems or processors performing those functions under software control. The computer system may alternatively be implemented by hardware or other processing circuitry. The various functions of the described stations that support embodiments of the described infrastructure and ad-hoc networks with simplified auto-configuration and service discovery may be distributed in any manner among any quantity (e.g., one or more) of hardware and/or software modules or units, computers or processing systems or circuitry.

From the foregoing description, it will be appreciated that a station that supports embodiments of the described infrastructure and ad-hoc networks with simplified auto-configuration and service discovery is disclosed. The described approach is compatible and may be seamlessly integrated within compliant hardware devices.

While a method and apparatus are disclosed that provide a station that supports embodiments of the described infrastructure and ad-hoc networks with simplified auto-configuration and service discovery, various modifications, variations and changes are possible within the skill of one of ordinary skill in the art, and fall within the scope of the present invention. Although specific terms are employed herein, they are used in their ordinary and accustomed manner only, unless expressly defined differently herein, and not for purposes of limitation.

What is claimed is:

1. A method for configuring a local station to communicate with one or more peer stations via a wireless network, the method comprising:

receiving a message from a peer station;

parsing the received message to retrieve a peer station information element, the peer station information element including a peer station network address and a peer station bitmap that indicates at least one of allocated and unallocated network addresses within a set of network addresses;

selecting a local station network address first portion of a local station network address for the local station based on the peer station network address;

selecting a local station network address second portion of the local station network address for the local station corresponding to a network address indicated as unallocated in the peer station bitmap;

transmitting another message containing a local station information element, the local station information element including the local station network address selected by the local station and a timestamp with information related to a time at which the local station network address second portion was allocated by the local station;

generating a local station bitmap that indicates at least one of allocated and unallocated network addresses within the set of network addresses;

including the generated local station bitmap in the local station information element;

updating the local station bitmap to indicate that a network address is unallocated when there is at least one failure to receive a message from the peer station associated with the network address for a predetermined period of time; and receiving a network beacon message with a peer station bitmap that indicates that the network address is not allocated.

2. The method of claim 1, wherein the wireless network is at least one of an ad-hoc mode wireless network and an infrastructure mode wireless network.

3. The method of claim 1, further comprising:

storing the peer station bitmap in association with the peer station.

4. The method of claim 1, further comprising:

generating a first timestamp with information related to a time at which the local station network address second portion was allocated by the local station.

5. The method of claim 4, wherein the peer station information element further includes:

a second timestamp with information related to a time at which a peer station network address second portion of the peer station network address was allocated by the peer station.

6. The method of claim 5, wherein the message is a first message, further comprising:

receiving a second message from the peer station after the local station has selected the local station network address second portion;

comparing the peer station network address second portion allocated by the peer station to the local station network address second portion allocated by the local station;

determining if the peer station network address second portion is the same as the local station network address second portion;

determining if the peer station network address second portion was allocated by the peer station before the local station network address second portion was allocated by the local station; and re-selecting a local station network address second portion of the local station network address for the local station corresponding to a network address indicated as unallocated in the peer station bitmap if the peer station network address second portion was allocated by the peer station before the local station network address second portion was allocated by the local station.

7. The method of claim 6, wherein determining if the peer station network address second portion was allocated by the peer station before the local station network address second portion was allocated by the local station is based on a comparison of the second timestamp received from the peer station and the first timestamp generated by the local station.

8. A method of performing auto-configuration and service discovery in a network, the method comprising:

receiving at a local station a message from a peer station;

parsing the message to retrieve an incoming peer station information element, the peer station information element including:

a peer station network address allocated by the peer station;

a peer station timestamp with information indicating a time at which the peer station network address was allocated by the peer station;

a peer station universally unique identifier (UUID) representing a service provided by the peer station; and a peer station bitmap that indicates at least one of allocated and unallocated network addresses within a set of network addresses;

storing information received in the message in a data store of the local station in association with the peer station;

parsing the data store of the local station on a periodic basis to collect information for use in generating a message for transmission, the generated message including an outgoing local station information element, the outgoing local station information element including:

a local station network address allocated by the local station;

a local station timestamp with information indicating a time at which the local station network address was allocated by the local station;

a local station universally unique identifier (UUID) representing a service provided by the local station; and a local station bitmap that indicates at least one of allocated and unallocated network addresses within the set of network addresses;

transmitting the generated message from the local station;

updating the local station bitmap to indicate that a network address is unallocated when there is at least one failure to receive a message from the peer station associated with the peer station network address for a predetermined period of time; and receiving a network beacon message with a peer station bitmap that indicates that the network address is not allocated.

9. The method of claim 8, wherein the network is at least one of an ad-hoc mode wireless network and an infrastructure mode wireless network.

10. A local station that communicates with one or more peer stations via a network, the local station comprising:

a physical network unit to receive a message from a peer station;

a message parsing unit to parse the message to retrieve a peer station information element, the peer station information element including a peer station network address of the peer station, a peer station bitmap that indicates at least one of allocated and unallocated network addresses within a set of network addresses, and a timestamp with information related to a time at which a peer station network address second portion of the peer station network address was allocated by the peer station; and a controller retrieve from the peer station information element a peer station network address first portion of the peer station network address allocated to the peer station and use the peer station network address first portion allocated to the peer station as a local station network address first portion of a local station network address allocated to the local station, and select a local station network address second portion of the local station network address for the local station based on information contained within the peer station bitmap, the controller to re-select a local station network address second portion of the local station network address for the local station corresponding to a network address indicated as unallocated in the peer station bitmap when the controller determines that the peer station network address second portion included in the message from the peer station matches the local station network address second portion allocated by the local station and determines that the peer station network address second portion was allocated by the peer station before the local station network address second portion was allocated by the local station.

11. A local station of claim 10, wherein the controller is configured to communicate with at least one of an ad-hoc mode wireless network and an infrastructure mode wireless network.

12. A local station of claim 10, further comprising:
an address bitmap generator that generates a local station bitmap that indicates at least one of allocated and unallocated network addresses within the set of network addresses based, in part, on information contained in the peer station bitmap in the received message and that updates the local station bitmap to indicate that a network address is unallocated when there is at least one of failing to receive a message from a peer station associated with the network address for a predetermined period of time; and
receiving a network beacon message with a peer station bitmap that indicates that the network address is not allocated.

13. The local station of claim 10, further comprising:
a data store unit that stores the peer station bitmap in a data store in association with the peer station.

14. The local station of claim 10, further comprising:
a clock control unit that generates a timestamp with information related to a time at which the local station network address second portion was allocated by the local station.

15. The local station of claim 14, further comprising:
a message generating unit that generates a message containing a local station information element, the local station information element including the local station network address second portion selected by the local station and the timestamp.

\* \* \* \* \*